United States Patent [19]

Kawabata et al.

[11] Patent Number: 5,202,556
[45] Date of Patent: Apr. 13, 1993

[54] DOCUMENT READING APPARATUS HAVING PHOTOCONDUCTIVE DETECTOR FOR DETECTING DOCUMENTS AND DOCUMENT EDGES

[75] Inventors: Takashi Kawabata, Isehara; Shinobu Fukuoka; Daiya Teranishi, both of Atsugi; Eiji Kamijo, Isehara; Seiji Hoshino, Atsugi, all of Japan

[73] Assignee: Ricoh Company, Ltd., Tokyo, Japan

[21] Appl. No.: 662,636

[22] Filed: Feb. 28, 1991

[30] Foreign Application Priority Data

Mar. 2, 1990 [JP] Japan .................................. 2-51212
Aug. 13, 1990 [JP] Japan ................................. 2-214578

[51] Int. Cl.$^5$ ........................................... H04N 1/024
[52] U.S. Cl. ................................ 250/208.1; 250/561; 358/488
[58] Field of Search ............... 250/208.1, 561, 223 R; 358/488, 449

[56] References Cited

U.S. PATENT DOCUMENTS 5,032,712  7/1991  Ito .................................. 250/208.1

FOREIGN PATENT DOCUMENTS 58-114665  7/1983  Japan .
59-37763   3/1984  Japan .
59-43667   3/1984  Japan .
60-130256  7/1985  Japan .................................. 358/488

OTHER PUBLICATIONS

D. C. Estabrooks, C. W. Knappenberger and J. T. Robinson, "Transparency Sensor." IBM Technical Disclosure Bulletin, vol. 23, No. 4 (Sep. 1980) p. 1355.

Primary Examiner—Constantine Hannaher
Attorney, Agent, or Firm—Oblon, Spivak, McClelland, Maier & Neustadt

[57] ABSTRACT

A document reading apparatus comprises a light source part for generating a light beam which scans a document being transported to a reading position along a main scan line by a predetermined scan width, a photoconductive part for supplying a signal outputted when illuminated by a light beam from the light source part, the photoconductive part having a plurality of photoconductive elements aligned within a predetermined width parallel to the main scan line, an optical part for focusing a light beam reflected from the document at the reading position into a reduced light beam and for irradiating the reduced light beam to the photoconductive part by an optical width in a direction parallel to the main scan line. The photoconductive elements extend in a direction parallel to the main scan line by a width difference by which the predetermined width of the photoconductive elements is greater than the optical width of the optical part. The photoconductive elements are divided into an image reading group arranged to read image information and a detection group arranged to detect a document and/or a front edge or rear edge of the document.

14 Claims, 20 Drawing Sheets

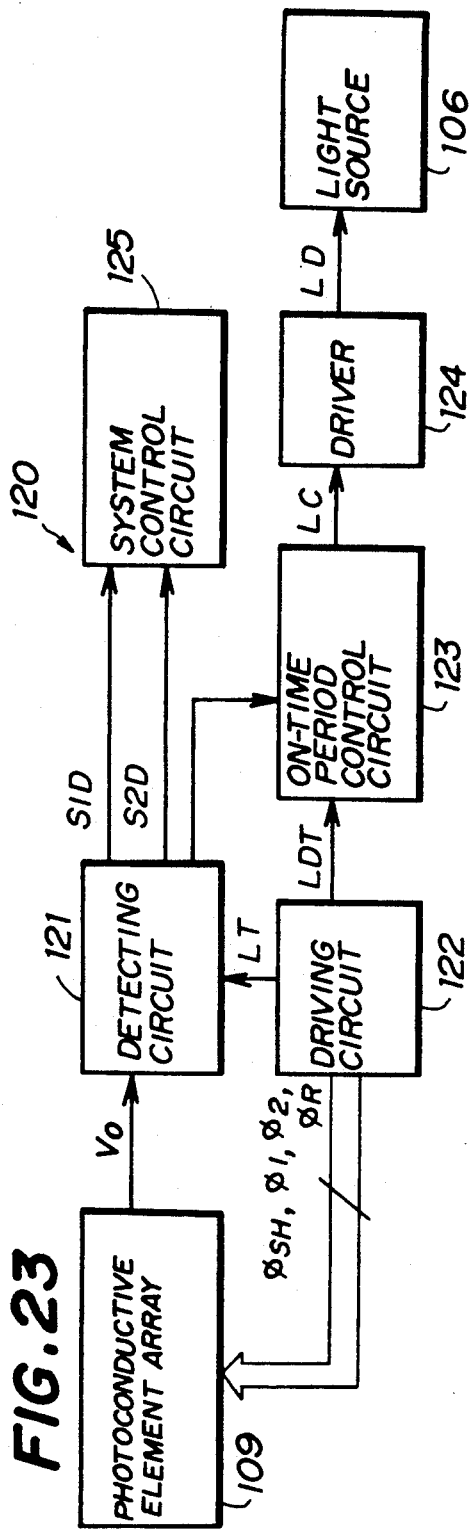
FIG. 23
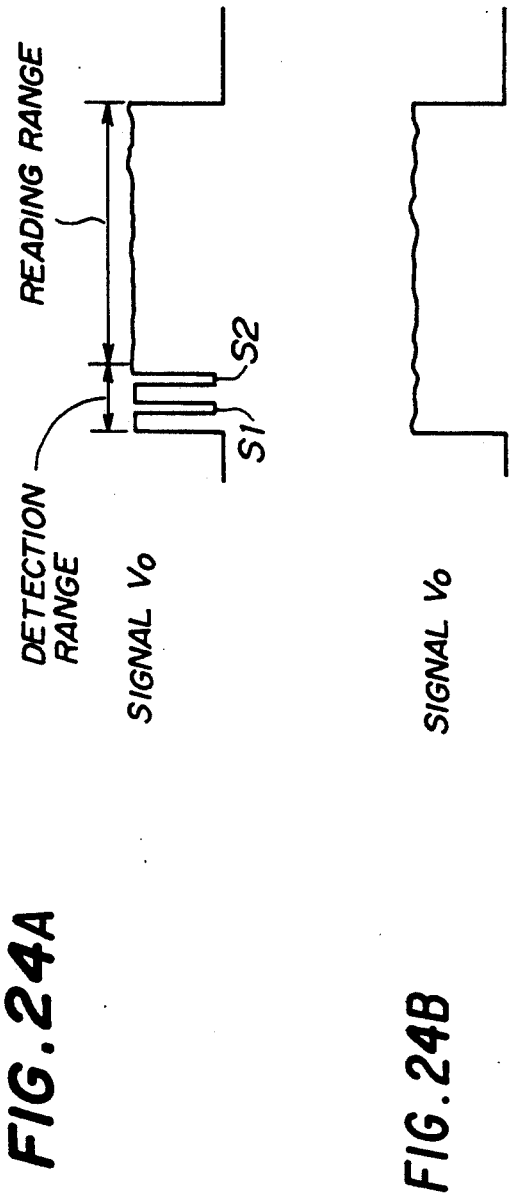
FIG. 24A
FIG. 24B

FIG.28
FIG.29
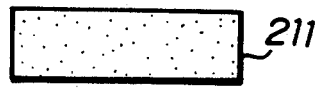
MAIN SCAN DIRECTION
FIG.30
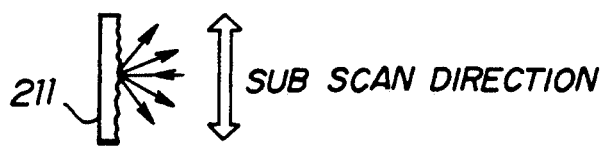
SUB SCAN DIRECTION
FIG.31
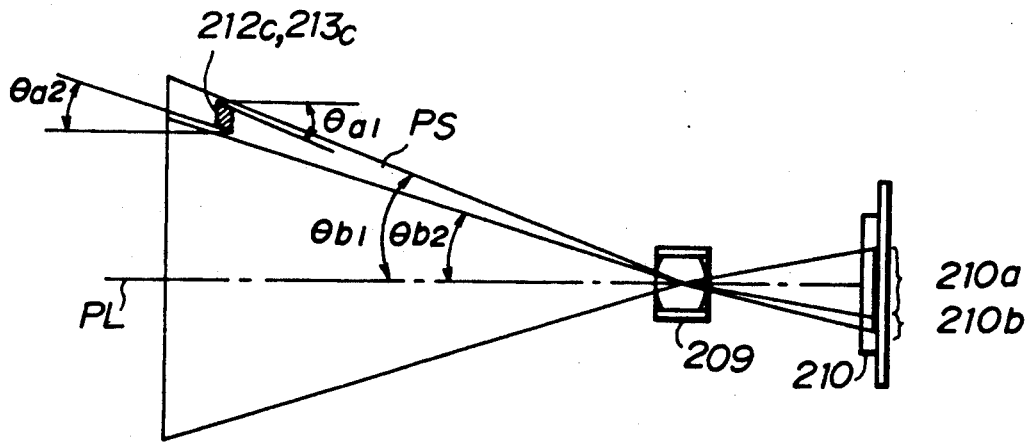

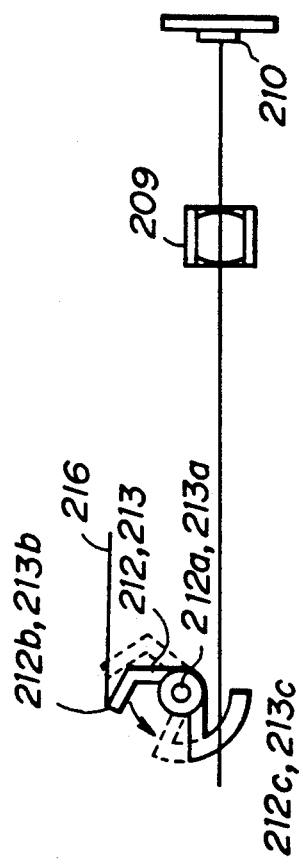
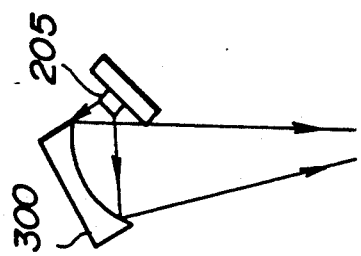

DOCUMENT READING APPARATUS HAVING PHOTOCONDUCTIVE DETECTOR FOR DETECTING DOCUMENTS AND DOCUMENT EDGES

BACKGROUND OF THE INVENTION

The present invention generally relates to a document reading apparatus, and more particularly to a document reading apparatus which can reliably detect a data sheet and a data sheet edge in a sheet transport path of the document reading apparatus.

Conventionally, a document reading apparatus may be used as a single data reading unit, or may be used within a scanning part of a facsimile or within a copying machine. In a case of such document reading apparatus, an original document is transported one by one along a transport path to a data reading part, and an image data reading from the original document is carried out by the data reading part. For this reason, the document reading apparatus must have a data sheet detecting part for detecting a data sheet on a data sheet plate, and a sheet edge detecting part for detecting a front edge or rear edge of the data sheet being transported.

FIG. 1 shows a construction of a facsimile 1 to which a conventional document reading apparatus 2 is applied. In this document reading apparatus 2 within the facsimile 1, a data sheet sensor 3 and a data sheet edge sensor 4 are provided. A data sheet or original document on a document board is transported one by one by means of an automatic feeding unit 5 to a data reading part 6. This data reading part 6 comprises a light source 7, a pair of ejection rollers 8, a plurality of mirrors 9, 10, 11, a lens 12 and a photoconductive element 13. The data reading part 6 in the document reading apparatus 2, a data sheet on the document board is detected by the data sheet sensor 3, and then the data sheet is transported one by one by the automatic feeding unit 5 to the data reading part 6. A front edge of the data sheet and a rear edge thereof are detected by the data sheet edge sensor 4. When the front edge of the data sheet is detected, the data reading part 6 starts a data reading of the data sheet. After the rear edge of the data sheet is detected, the data reading part 6 carries out the data reading until the rear edge thereof is detected, and the data reading is ended. In FIG. 1, the facsimile 1 has a facsimile control unit 14, a roll of recording paper 15, a thermal head 16 and a platen roller 17. The direction in which a data sheet is transported by the automatic feeding unit 5 is indicated by an arrow A, and the direction in which the recording paper is transported is indicated by an arrow B.

Conventionally, a photocoupler is used for the data sheet sensor 3 and the data sheet edge sensor 4. A light beam emitted from the photocoupler is irradiated to the data sheet and a reflected light beam reflected on the data sheet is received by the photocoupler to detect the data sheet or the front edge or rear edge of the data sheet. There are another sensing units which are disclosed, for example, in Japanese Laid-Open Utility Model Application No. 54-47314 and Japanese Utility Model Publication No. 63-29332. In the case of these sensing units, a detection lever or actuator is moved by an original document when it is transported, and a movement of the detection lever or actuator is sensed by a reflection type photocoupler for detecting the original document or a front edge or rear edge of the original document.

However, there is a problem in that the photocoupler used in such a conventional document reading apparatus is expensive, and especially a harness attached to the photocoupler and a printed circuit board prepared for the photocoupler are required to make use of the photocoupler. Therefore, the product cost required for a data sheet detection and a data sheet edge detection becomes high, thereby making the cost for the document reading apparatus apparatus higher.

An improved data sheet detection method has been proposed by the same applicant, in which a solid-type image pickup element is used for data sheet detection instead of the photocoupler, this solid-type image pickup element is similar to a solid-type image pickup element used for reading image data from a data sheet. This data sheet detection method is disclosed, for example, in Japanese Laid-Open Patent Application No. 59-37763. A document reading apparatus according to the data sheet detection method as disclosed, comprises a first photoconductive element for reading image data from a data sheet and a second photoconductive element for detecting a data sheet, the second photoconductive element provided at a position apart from the first photoconductive element in a sub scan direction. An image reading and a data sheet detection are carried out in this document reading apparatus by detecting serially a signal outputted from the first photoconductive element and a signal outputted from the second photoconductive element. However, in this data sheet detection method, the first photoconductive element for reading image data and the second photoconductive element for detecting a data sheet must be placed apart form each other. Therefore, two solid-type image pickup elements which are provided on different integrated circuit chips are necessary for manufacturing such a document reading apparatus, and there is a margin of improvement of the document reading apparatus for the cost reduction. And, in the case of the above data sheet detection method, the degree of freedom to design the document reading apparatus is limited.

SUMMARY OF THE INVENTION

Accordingly, it is a general object of the present invention to provide an improved document reading apparatus in which the above described problems are eliminated.

Another and more specific object of the present invention is to provide a document reading apparatus which comprises a light source part for generating a light beam which scans a document at a reading position along a main scan line by a predetermined scan width in parallel to the main scan line, the document being transported along a transport path to the reading position, a photoconductive part for supplying a signal outputted when the photoconductive part is illuminated by a light beam from the light source part, the photoconductive part having a plurality of photoconductive elements aligned within a predetermined width in parallel to the main scan line, and an optical part for focusing a light beam reflected from the document at the reading position into a reduced light beam and for irradiating the reduced light beam to the photoconductive part by an optical width on the photoconductive part in a direction parallel to the main scan line, the plurality of photoconductive elements of the photoconductive part extending in a direction parallel to the main scan line by a width difference by which the predetermined width of the photoconductive element is greater than the optical width of the optical part, the plurality of photoconductive elements in the photoconductive part being divided into an image reading group arranged to read an image information from the document and a detection group arranged to detect the presence of a document and/or a front edge or rear edge of the document in the transport path. According to the present invention, it is possible to read image information from a document and detect the presence of the document and/or a front edge or rear edge of the document with a single photoconductive part, thus making the required control circuits simple, reducing the manufacturing cost and ensuring an improvement in the degree of freedom to design the document reading apparatus.

Still another object of the present invention is to provide a document reading apparatus which comprises a document board on which a plurality of documents are placed, a transport path along which a document among the plurality of documents is transported to a reading position where image information is read from the document, a light source part for generating a light beam which scans a document at the reading position along a main scan line by a predetermined scan width in parallel to the main scan line, the light source part having a plurality of light emitting elements aligned in a direction parallel to the main scan line, the plurality of light emitting elements being divided into a scanning group and a detection group, a photoconductive part for supplying a signal outputted when the photoconductive part is illuminated by a light beam from the light source part, the photoconductive part having a plurality of photoconductive elements aligned within a predetermined width in a direction parallel to the main scan line, the plurality of photoconductive elements of the photoconductive part extending in a direction parallel to the main scan line by a width difference by which the predetermined width of the photoconductive elements is greater than the optical width on the optical part, the plurality of photoconductive elements of the photoconductive part being divided into an image reading group arranged to read the image information from the document and a document detecting group arranged to detect the presence of the document on the document board and/or a front edge or rear edge of the document in the transport path, an optical part for focusing a light beam reflected from the document at the reading position into a reduced light beam and for irradiating the reduced light beam to the photoconductive part by an optical width on the photoconductive part in a direction parallel to the main scan line, a document detection part provided rotatably and having an end portion which projects over an optical path of a light beam from the detection group of light emitting elements in which the light beam is directed by the optical part to the document detecting group of photoconductive elements is partially cut off by the end portion when the document detection part is not rotated by the document placed on the document board or transported along the transport path, and an on-time period control part for controlling a turn-on time period of the scanning group of light emitting elements in the light source part for which the light emitting elements of the scanning group are turned ON continuously, wherein a transport condition of a document being placed or transported within the document reading apparatus is detected on the basis of a signal outputted from the document detecting group in the photoconductive part when a light beam supplied from the detection group in the light source part and directed to the document detecting group in the photoconductive part is partially cut off by the end portion of the document detection part, thereby allowing the on-time period control part to control the turn-on time period of the scanning group of light emitting elements in the light source part. According to the present invention, it is possible to read image information from a document and detect the presence of the document on the document board with a single photoconductive part and a single printer circuit board on which a plurality of light emitting elements are arranged. The turn-on time period of the image reading group of light emitting elements during a period other than the image reading time period can be made smaller than the turn-on time period of the image reading group of light emitting elements during the image reading time period. Thus, it is possible to make the control circuits required for controlling the scanning group of light emitting elements simple, thereby reducing the manufacturing cost for the document reading apparatus, and ensuring an improvement in the degree of freedom to design the document reading apparatus. And, it is possible to prevent early deterioration of the light emitting elements of the scanning group.

A further object of the present invention is to provide a document reading apparatus which comprises a document board on which a plurality of documents are placed, a transport path along which a document among the plurality of documents is transported to a reading position where image information is read from the document, a light source part for generating a light beam which scans a document at the reading position along a main scan line by a predetermined scan width in parallel to the main scan line, the light source part having a plurality of light emitting elements aligned in a direction parallel to the main scan line, the plurality of light emitting elements being divided into a scanning group and a detection group, the detection group of light emitting elements being turned ON invariably when a power switch of the document reading apparatus is turned ON, a photoconductive part for supplying a signal outputted when the photoconductive part is illuminated by a light beam from the light source part, the photoconductive part having a plurality of photoconductive elements aligned within a predetermined width in a direction parallel to the main scan line, the plurality of photoconductive elements of the photoconductive part extending in a direction parallel to the mains scan line by a width difference by which the predetermined width of the photoconductive elements is greater than the optical width of the optical part, the plurality of photoconductive elements of the photoconductive part being divided into an image reading group arranged to read the image information from the document and a document detecting group arranged to detect the presence of the document on the document board and/or a front edge or rear edge of the document in the transport path, an optical part for focusing a light beam reflected from the document at the reading position into a reduced light beam and for irradiating the reduced light beam to the photoconductive part by an optical width on the photoconductive part in a direction parallel to the main scan line, a reflection part for reflecting a light beam supplied from the detection group of light emitting elements and for irradiating the reflected light beam to the document detecting group of photoconductive elements through the optical part, and a document detection part provided rotatably and having an end portion which projects over an optical path of a light beam from the detection group of light emitting elements in which the light beam is directed by the reflection part and by the optical part to the document detecting group of photoconductive elements is partially cut off by the end portion when the document detection part is not rotated by the document placed on the document board or transported along the transport path, wherein a transport condition of a document being placed or transported within the document reading apparatus is detected on the basis of a signal outputted from the document detecting group in the photoconductive part when a light beam supplied from the detection group in the light source part and directed to the document detecting group in the photoconductive part is partially cut off by the end portion of the document detection part. According to the present invention, it is possible to read image information and detect the presence of the document and/or a front edge or rear edge of the document with a single photoconductive part and a single printed circuit board on which a plurality of light emitting elements are arranged. A light beam emitted from the scanning group of light emitting elements is efficiently irradiated to the detection group of photoconductive elements. Thus, it is possible to make the control circuits required for controlling the scanning group of light emitting elements simple, thereby reducing the manufacturing cost for the document reading apparatus, and ensuring an improvement in the degree of freedom to design the document reading apparatus. And, it is possible to detect accurately the front edge or rear edge of the document being transported along the transport path. In addition, it is possible to prevent early deterioration of the light emitting elements of the scanning group.

Other objects and further features of the present invention will be apparent from the following detailed description when read in conjunction with the accompanying drawings.

BRIEF DESCRIPTION OF THE DRAWINGS

FIG. 23 is a block chart for explaining a control circuit for controlling the document reading apparatus of FIG. 21;

FIG. 24A and 24B are diagrams for explaining a signal outputted from the photoconductive element array when no data sheet is placed and a signal outputted from the photoconductive element array when a data sheet edge is detected;

FIG. 28 is a diagram for explaining an example of a reflector having a treated surface used in the document reading apparatus of FIG. 26;

FIG. 29 is a diagram for explaining a modified example of the reflector used in the document reading apparatus of FIG. 26;

FIG. 30 is a diagram for explaining a diffused light from the reflector of FIG. 29;

FIG. 31 is a diagram for explaining the configuration of an end portion of an actuator used in the document reading apparatus of FIG. 26;

FIG. 32 is a diagram for explaining the operation of the end portion of the actuator of FIG. 31; and FIGS. 33 through 36 are views showing several modified examples of the reflectors for use with the document reading apparatus.

DESCRIPTION OF THE PREFERRED EMBODIMENTS

First, a description will be given of a first embodiment of a document reading apparatus according to the present invention, with reference to FIGS. 2 through 12.

Figure 1:
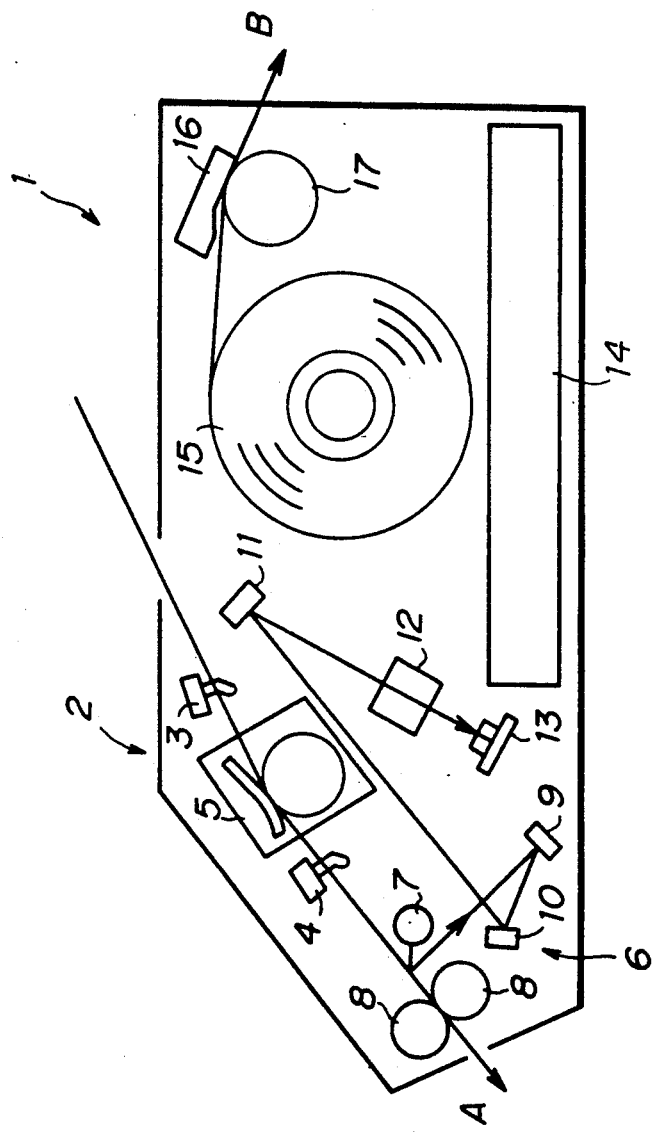
FIG. 1 is a view showing the construction of a facsimile apparatus to which a conventional data reading apparatus is applied.
Figure 2:
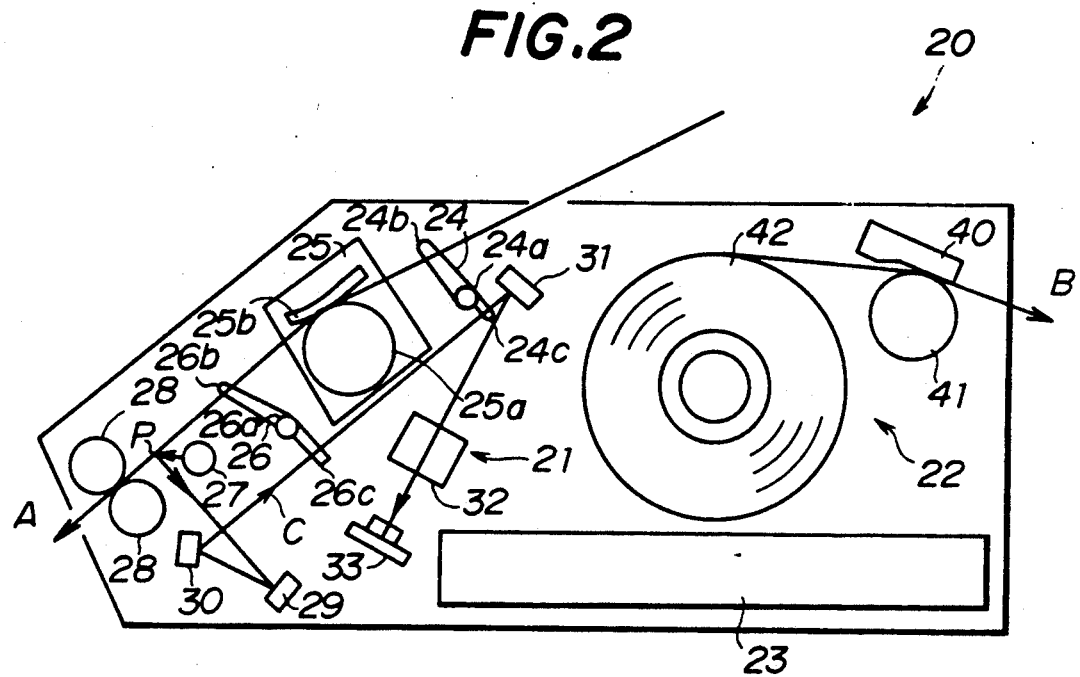
FIG. 2 is a view showing a first embodiment of a document reading apparatus according to the present invention.

FIG. 2 shows a construction of a facsimile apparatus 20 to which the document reading apparatus according to the present invention is applied. This facsimile apparatus 20 generally has a data reading unit 21, a recording unit 22 and a control unit 23. The data reading unit 21 includes a document board (not shown), a data sheet detecting actuator 24, an automatic sheet feeding unit 25, a sheet edge detecting actuator 26, a light source 27, a pair of ejection rollers 28, a number of mirrors 29, 30, 31, a lens 32 and a photoconductive element array 33. The data sheet detecting actuator 24 is rotatably supported by a supporting pin 24b, and an end portion 24b of the data sheet detecting actuator 24 extends on the document board on which a plurality of data sheets are paced. And, the data sheet detecting actuator 24 has an end portion 24c which extends opposite to the end portion 24b and projects over an optical path that will be described later. The data sheet detecting actuator 24 is rotated around the supporting pin 24a when the end portion 24b is moved by a data sheet which is transported along a sheet transport path as indicated by an arrow A in FIG. 2. The automatic sheet feeding unit 25 has a transport roller 25a and a separator 25b, and a few data sheets from a lower part thereof on the document board are fed by the transport roller 25a and the data sheets are separated from each other one by one by the separator 25b.

The sheet edge detecting actuator 26 is rotatably supported by a supporting pin 26, and an end portion 26b of the sheet edge detecting actuator 26 projects over the sheet transport path along which a data sheet is transported. An end portion 26c of the sheet edge detecting actuator 26 which is located opposite to the end portion 26b projects over the optical path that will be described in greater detail later. The sheet edge detecting actuator 26 is rotated around the supporting pin 26a when the end portion 26b is moved by a data sheet which is transported along the sheet transport path.

Figure 3:
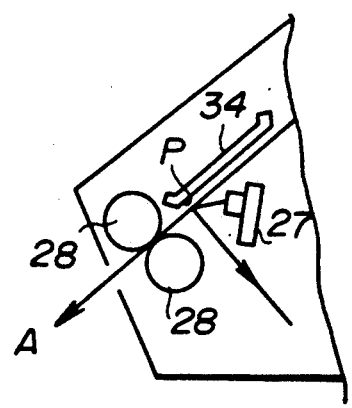
FIG. 3 is an enlarged view showing a data reading part of the document reading apparatus of FIG. 2.
Figure 4:
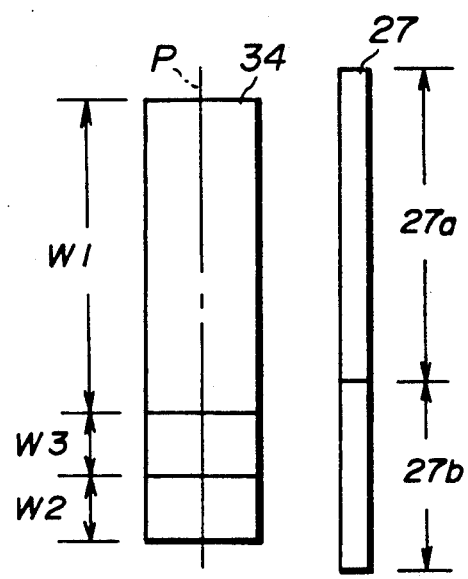
FIG. 4 is a view showing a retaining board and a light source which are used in the data reading part of FIG. 3.
Figure 5:
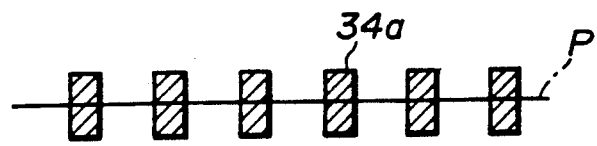
FIG. 5 is a diagram for explaining a stripe pattern which is provided on the retaining board of FIG. 4.

The light source 27 emits a light beam irradiating a data sheet which is located along the sheet transport path at a position P, as indicated in FIG. 2. A light beam reflected back from the data sheet at the position P is reflected on the mirrors 29, 30 and 31, respectively, and passes through the lens 32. A light beam passing through the lens 32 is received by the photoconductive element array 33. At the position P where a light beam emitted from the light source 27 is irradiated, a retaining board 34 is provided on the opposite side of the light source 27 with respect to the sheet transport path A shown in FIG. 3. As shown in FIG. 4, the retaining board 34 is formed to have a width that is greater than the maximum reading width (a data reading range W1) of a data sheet being transported along the sheet transport path by a predetermined length. One surface of the retaining board 34 confronting the light source 27 is painted in white for shading correction, and it is preferred to provide a stripe pattern 34a on this painted surface of the retaining board 34, as shown in FIG. 5. And, apart form the data reading range W1, the retaining board 34 is divided into two additional ranges W2 and W3 which go beyond the data reading range W1, as shown in FIG. 4. The range W2 of the retaining board 34 with relation to the width thereof corresponds to a position of the optical path over which the end portion 24c of the data sheet detecting actuator 24 projects, and the range W3 of the retaining board 34 corresponds to a position of the optical path over which the end portion 26c of the sheet edge detecting actuator 26 projects.

Figure 6:
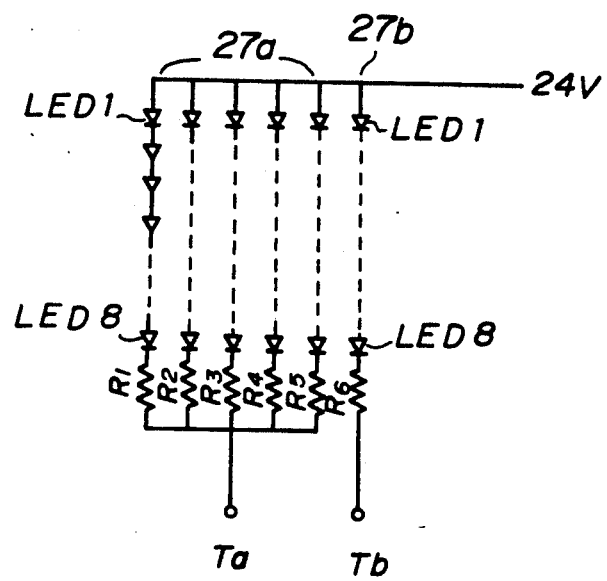
FIG. 6 is a view showing a control circuit for controlling the light source of FIG. 4.

The light source 27 used is formed by a plurality of light emitting elements which may be a plurality of light emitting diodes (LEDs) arranged separately from one another in a direction of the width of the data sheet, or a main scan direction, that is perpendicular to the direction of the sheet transport path. The plurality of light emitting elements are divided into two groups, an image reading group 27a and a detection group 27b. The image reading group 27a of light emitting elements generate a light beam for reading an image of the data sheet, the light beam being irradiated to the data reading region W1 of the retaining board 34, while the detection group 27b of light emitting elements generate a light beam for detecting the presence of a data sheet, the light beam being irradiated to the ranges W2 and W3 of the retaining board 34. The light emitting elements (LEDs) of the image reading group 27a and the detection group 27b are, for example, connected to different terminals of different control circuits as shown in FIG. 6. The image reading group 27a of light emitting elements are connected to a terminal Ta of a control circuit for image reading, while the detection group 27b of light emitting elements are connected to a terminal Tb of a control circuit for data sheet detection. Thus, the driving of the light emitting elements of these two groups can be controlled separately by the different control circuits. As shown in FIG. 6, the image reading group 27a is made up of five blocks of light emitting elements, each block having a plurality of light emitting diodes (LED1 through LED8) and a resistor being connected in serial, and the detection group 27b is made up of one block having a plurality of light emitting diodes (LED1 through LED8) and a resistor (R6) being connected in serial.

The arrangements of the retaining board 34 and the light source 27 are not limited to the above described embodiment. For example, the arrangements shown in FIG. 7 may be used for this purpose. In the arrangement of the retaining board 34 shown in FIG. 7, it is possible that the data reading range W1 is provided at a middle portion of the retaining board 34, the range W2 corresponding to the data sheet detecting actuator 24 and the range W3 corresponding to the sheet edge detecting actuator 26 being provided at end portions of the retaining board 34. In accordance with such a retaining board 34, the light source 27 may be formed to have an image reading group 27a of light emitting elements at the middle portion thereof, a group 27c of light emitting elements for the data sheet detecting actuator 24 and a group 27d of light emitting elements for the sheet edge detecting actuator 26 being provided at the end portions of the light source 27.

A light beam reflected on the data sheet at the position P is reflected on the mirrors 29, 30, 31, and then the reflected light beam passes through the lens 21 and is irradiated to the photoconductive element array 33.

Figure 8:
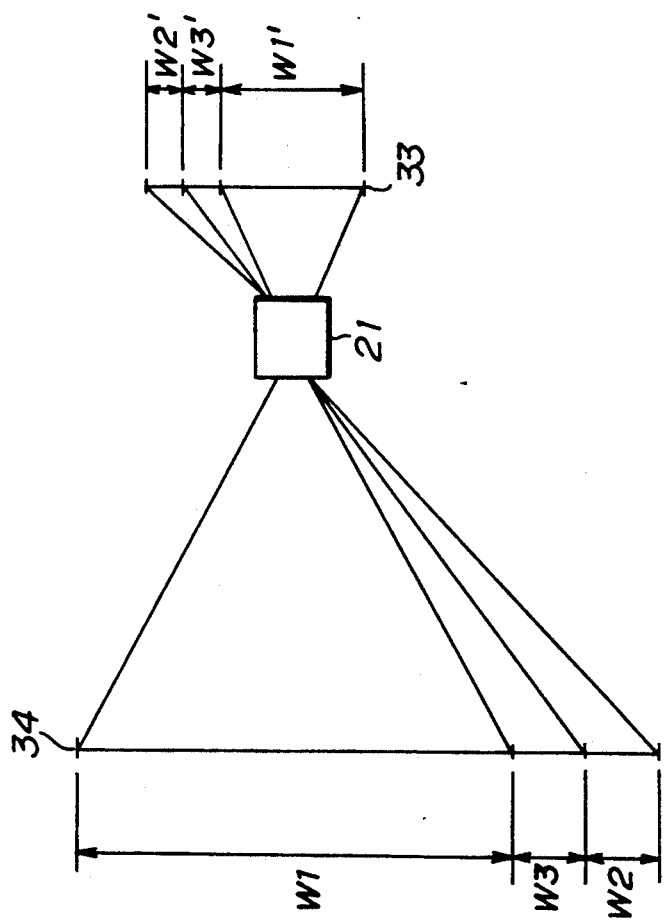
FIG. 8 is a diagram for explaining a relationship between regions of the retaining board and regions of a photoconductive element array in the example as shown in FIG. 4.

The photoconductive element array 33 can be made up of charge coupled devices (CCDs), for example. In the photoconductive element array 33, a plurality of photoconductive elements are arranged in a row along the direction of the width of in a direction parallel to a main scanning line in which a light beam is scanned over the data sheet along a width corresponding to the width of the photoconductive element array 33. This photoconductive element array 33 is formed so as to have a width that is greater than a width, in which a light beam reflected from the data reading range W1 of the retaining board 34 is irradiated, by a prescribed width. The photoconductive element array is made up of a plurality of photoconductive elements, and these photoconductive elements are divided into three different ranges, an image reading range W1'0 for reading an image data from a data sheet, a data sheet detection range W2' for detecting the presence of the data sheet, and a sheet edge detection range W3' for detecting a front edge or rear edge of the data sheet. As shown in FIG. 8, a light beam reflected from the data reading range W1 of the retaining board 34 is irradiated to the image reading range W1' of the photoconductive element array 33, and a light beam reflected from the range W2 of the board 34 is irradiated to the data sheet detection range W2 of the array 33, and a light beam reflected from the range W3 of the board 34 is irradiated to the sheet edge detection range W3' of the array 33.

Generally, a charge coupled device (CCD) unit for a B4 size facsimile machine is less expensive per unit length than that for an A4 size facsimile machine. By making use of a B4 size CCD unit as the photoconductive element array 33 in the A4 size facsimile machine, it is possible to provide a facsimile apparatus which is less expensive and has a number of CCD devices corresponding to the image reading range W1' (equivalent to the maximum reading width of a A4 size sheet) as well as a number of CCD devices corresponding to the data sheet detection range W2, and to the sheet edge detection range W3'. having the three ranges W1', W2' and W3'. For example, when a facsimile apparatus has a resolution of 8 lines per millimeter, 2048 picture elements can be formed by the B4 size CCD unit. In the case of the A4 size facsimile, only 1728 picture elements are required for the image data reading range W1' of an A4 size data sheet, and the remaining 320 picture elements of the B4 size CCD unit may be used for the data sheet detection range W2' and the sheet edge detection range W3' of the array 33. Therefore, such a photoconductive element array 33 having a width of the image reading range W1' can be produced with ease and low cost.

Figure 7:
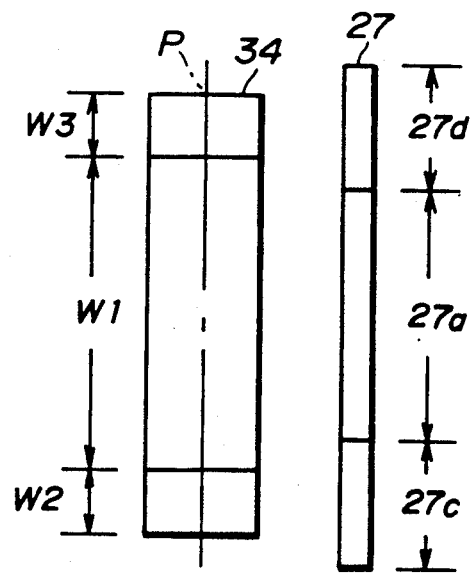
FIG. 7 is a view showing another example of a retaining board and a light source which are used in the data reading part of FIG. 3.
Figure 9:
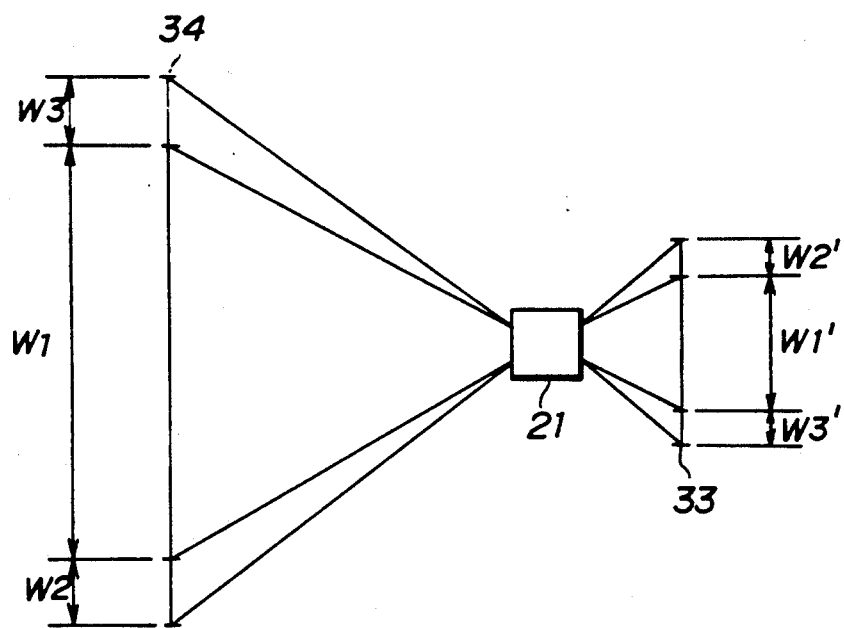
FIG. 9 is a diagram for explaining a relationship between regions of the retaining board and regions of a photoconductive element array in another example as shown in FIG. 7.

The arrangement of the photoconductive element array 33 is not limited to the example shown in FIG. 7, and modifications may be made without departing from the scope of the present invention. As shown in FIG. 9, the photoconductive element array 33 may be formed so as to place the image reading range W1' at the center portion and the data sheet detection range W2' and the sheet edge detection range W3' at the end portions.

The recording unit 22 generally has a thermal head 40, a platen roller 41 and a roll of recording sheet 42. The recording sheet 42 is supplied to a position between the thermal head 40 and the platen roller 41, the supplied recording sheet 42 is transported by the platen roller 41 along a transport path indicated by an arrow B in FIG. 2, while the recording sheet 42 is pressed against the thermal head 40 by the platen roller 41.

Figure 10:
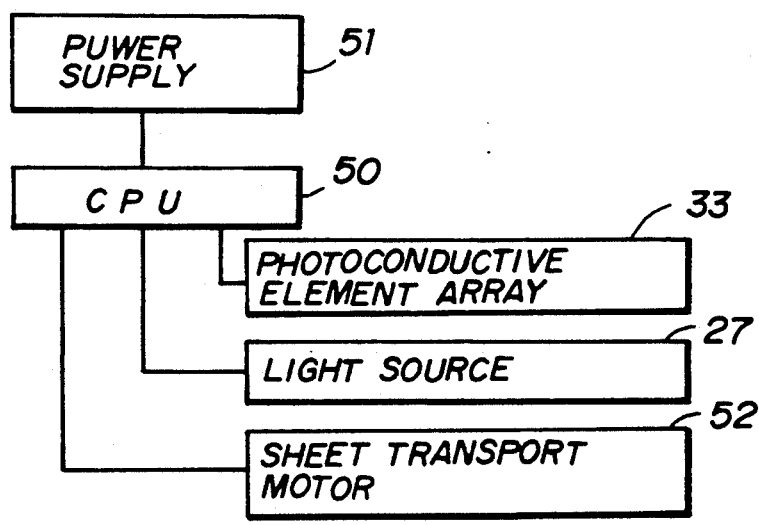
FIG. 10 is a block diagram for explaining the construction of a circuit provided in a major part of the facsimile apparatus of FIG. 2.

During the transport of the recording sheet 42, an image is recorded on the recording sheet 42 by the thermal head 40. As shown in FIG. 10, the control unit 23 generally has a central processing unit (CPU) 50. A power is supplied from a power supply 51 to the CPU 50, and this CPU 50 carries out a driving control over the photoconductive element array 33, the light source 27 and a data sheet transport motor 52. The arrow A shown in FIG. 2 indicates the direction in which a data sheet is transported, the arrow B indicates the direction in which the recording sheet 42 is transported, and the arrow C indicates the direction along which a light beam emitted from the light source 27 is reflected and passes.

Figure 11:
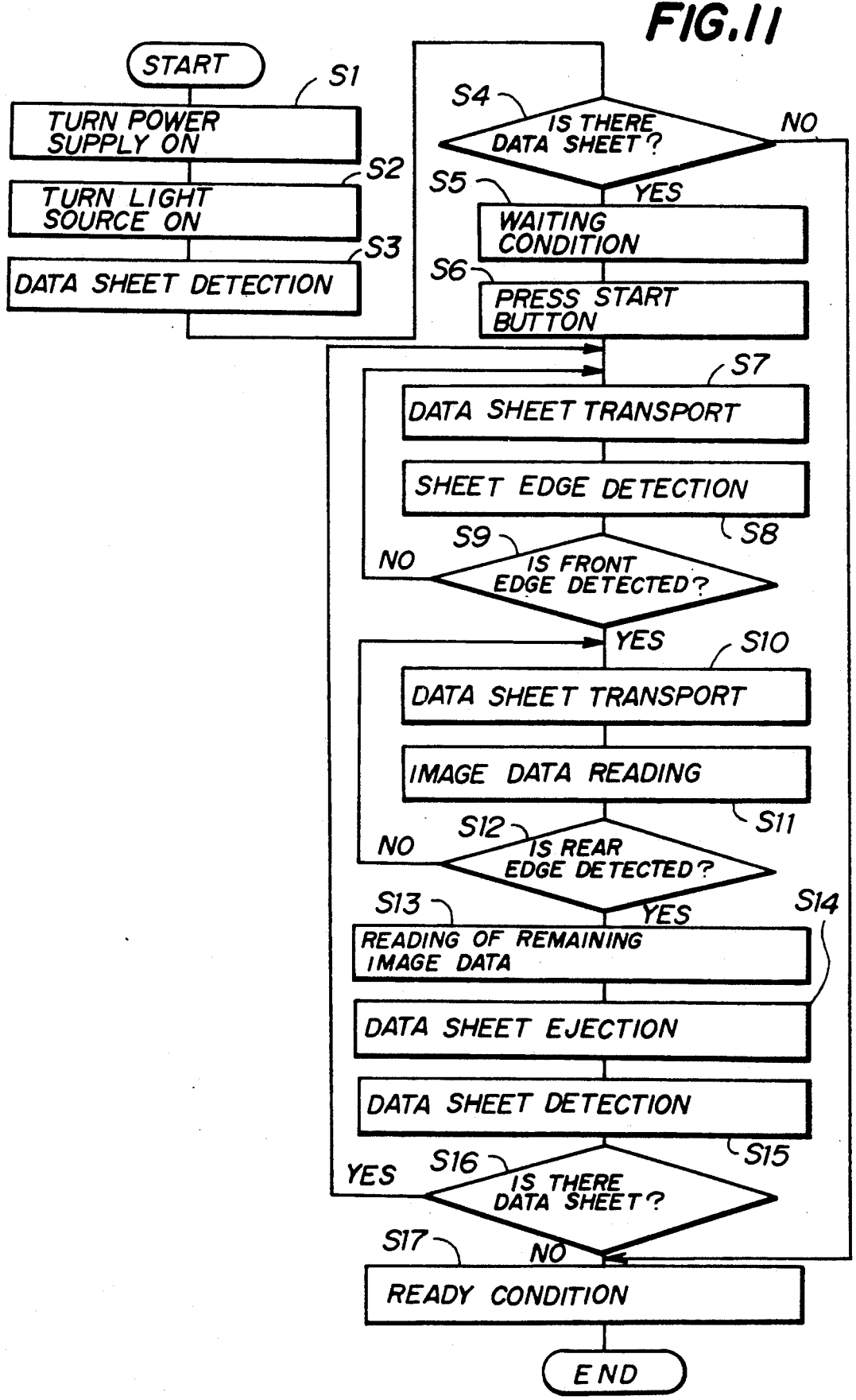
FIG. 11 is a flow chart for explaining a data sheet detection process and a data sheet edge detection process in the example of FIG. 4.

Next, a description will be given of the operation of the facsimile apparatus 20, with reference to FIGS. 11 and 12. The facsimile apparatus 20 starts operation to read an image from a data sheet for data transmission and copying procedures when a data sheet is placed on the document board and a start button is depressed. In FIG. 11, a step S1 turns a power switch of the facsimile apparatus 20 ON, and a step S2 turns the light source 27 ON. In this case, it is possible to turn ON all the light emitting elements included in the light source 27, or it is possible to turn ON partially the data sheet detection group 27b of light emitting elements in the light source 27 shown in FIG. 4. Otherwise, it is possible to turn ON only the data sheet detection groups 27c and 27d of light emitting elements. And, turning ON part of the light emitting elements included in the light source 27 for data sheet detection allows a reduction of power consumption and a prevention of early deterioration of the light source 27.

A step S3 detects the data sheet at the position P with a light beam emitted from the light source 27. If the data sheet is detected in a step S4, then a step S5 sets the facsimile apparatus 20 in a waiting condition in which a data reading of the data sheet by the facsimile apparatus 20 is awaited. When there is no data sheet on the document board, the end portion 24c of the data sheet detecting actuator 24 is placed within the optical path in which a light beam from the light emitting elements of the data sheet detection group 27b, 27c or 27d passes, and the region W2' of the photoconductive element array 33 is not irradiated by the light beam. Therefore, it is possible to check whether a data sheet is placed on the document board by checking a signal outputted from the light emitting elements of the data sheet detecting region W2' of the array 33. When such a stripe pattern 34a as shown in FIG. 5 is provided in the data sheet detecting region W2 of the retaining board 34, a movement of the end portion 24c of the data sheet detecting actuator 24 can be accurately detected.

A step S6 depresses a start button of the facsimile apparatus 20, and a step S7 starts to transport the data sheet by driving the sheet transport motor 42. A step S8 carries out a sheet edge detection, and a step S9 checks whether a front edge of the data sheet is detected. If the front edge is detected, then a step S10 carries out a data sheet transport and a step S11 reads an image data from the data sheet. More specifically, the end portion 26b of the sheet edge detecting actuator 26 is located within the sheet transport path, and if no data sheet is transported, the end portion 26c thereof remains in the optical path in which a light beam supplied from the data sheet detection group 27b, 27c or 27d of the light source 27 is irradiated to the sheet edge detecting region W3' of the photoconductive element array 33. If the data sheet is transported along the sheet transport path, the end portion 26b of the sheet edge detecting actuator 26 is moved by the data sheet and the sheet edge detecting actuator 26 is rotated around the supporting pin 26a and the end portion 26c thereof departs from the optical path. Therefore, it is possible to detect a front edge or rear edge of the data sheet being transported by checking a signal outputted from the light emitting elements of the sheet edge detecting region W3' of the photoconductive element array 33. When such a stripe pattern 34a as shown in FIG. 5 is provided in the sheet edge detecting region W3 of the retaining board 34, a movement of the end portion 26c of the sheet edge detecting actuator 26 can be accurately detected. In the case where only the light emitting elements in the data sheet detection group 27b, 27c or 27d of the light source 27 are turned ON when the power switch of the facsimile apparatus 20 is depressed, the light emitting elements in the image reading region 27a thereof may be turned ON at a timing by which the front edge of the data sheet is detected.

A step S12 checks whether the rear edge of the data sheet is detected when the image data reading is carried out. If the rear edge thereof is detected, then a step S13 carries out a reading of the remaining image data of the data sheet for a prescribed period of time, because it takes a prescribed time to transport the data sheet from a position where the rear edge of the data sheet is detected to the position P where the image data is read from the data sheet. A step S14 carries out an ejection of the data sheet when the image data reading from that data sheet is completed. A step S15 carries out again a data sheet detection, and a step S16 checks whether there is a next data sheet on the document board of the facsimile apparatus 20. If a next data sheet is on the document board, then the step S7 above is taken to carry out a data sheet transport and the subsequent steps S8 through S15 are performed. When all the data sheets on the document board are detected and the image data reading is completed, a step S17 makes the facsimile apparatus 20 return back to a ready condition, and the above described flow of the operation of the facsimile apparatus 20 is ended.

In the case of the above operation flow as shown in FIG. 11, the light emitting elements in the data sheet detection group 27b, 27c or 27d of the light source 27 are turned on when the power switch of the facsimile apparatus 20 is depressed. However, the present invention is not limited to the above embodiment. Turning the light source 27 ON may be carried out after the start button of the facsimile apparatus 20 is depressed, as in the flow chart shown in FIG. 12. In other words, the light source 27 is not turned on just when the power switch of the facsimile apparatus 20 is depressed. After a data sheet is placed on the document board and the start button is depressed, the light source 27 is turned ON. A description will be given of such an operation of the facsimile apparatus 20, with reference to FIG. 12.

Figure 12:
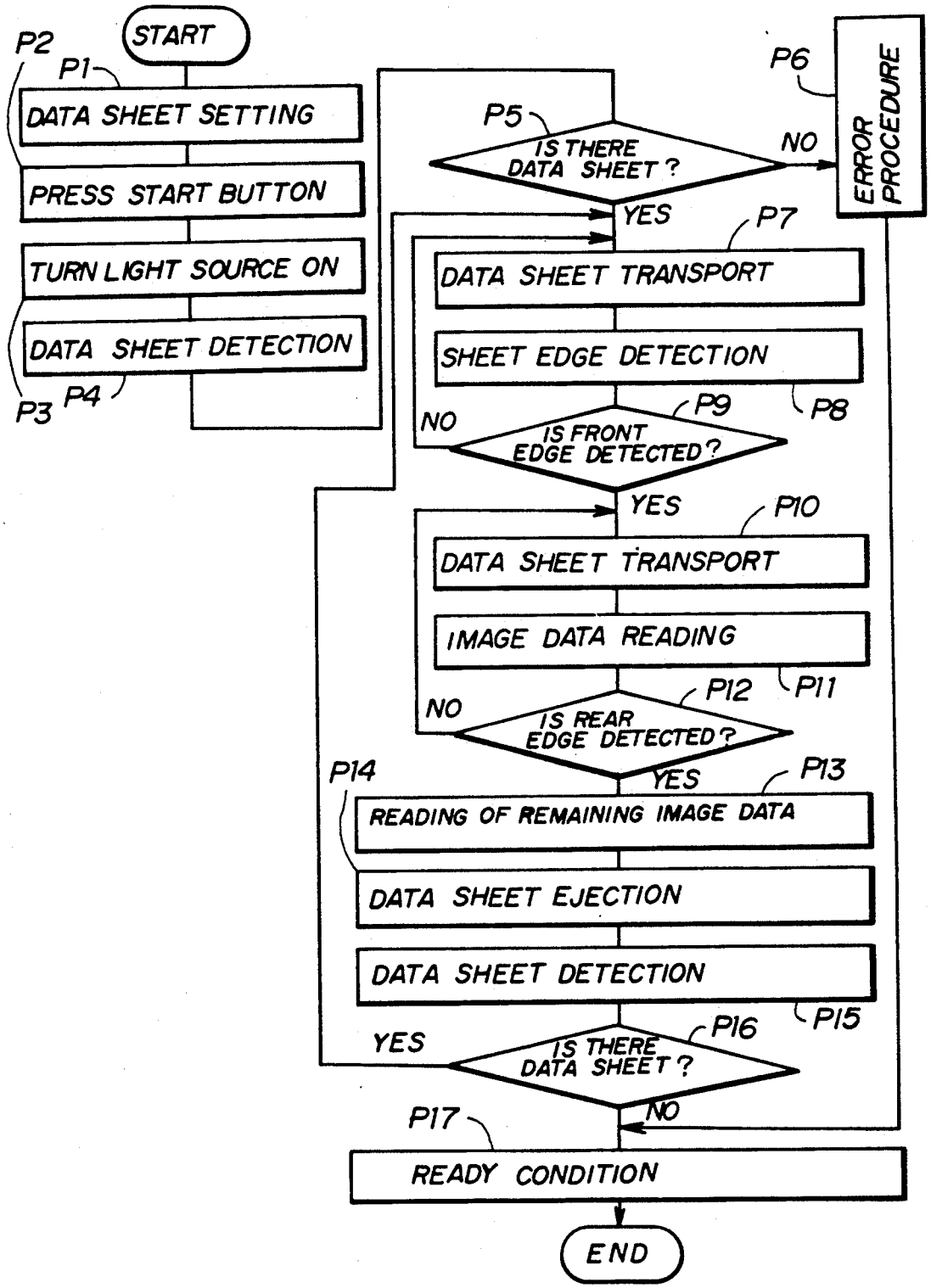
FIG. 12 is a flow chart for explaining a data sheet detection process and a data sheet edge detection process in another example of FIG. 7.

As shown in FIG. 12, a data sheet is placed on the document board of the facsimile apparatus 20 (step P1), and the start button is depressed (step P2). Then, a step P3 makes the CPU 50 turn the light source 27 ON to start a light emission. In this case, it is possible to turn on all the light emitting elements included in the light source 27 or turn on only the light emitting elements in the data sheet detection group 27b, 27c or 27d thereof.

A step P4 carries out a data sheet detection after the light source 27 is turned on. A step P5 checks whether there is a data sheet on the document board. If no data sheet is detected, then a step P6 carries out an error procedure and then a step P17 is taken to make the facsimile apparatus 20 return to a ready condition. If a data sheet on the document board is detected, then a step P7 carries out a sheet transport of the data sheet along the sheet transport path and a step P8 carries out a sheet edge detection. A step P9 checks whether a front edge of the data sheet is detected. If a front edge thereof is detected, then a step P10 transports the data sheet along the sheet transport path, and a step P11 carries out an image data reading of the data sheet. Then, a step P12 checks whether a rear edge of the data sheet is detected. If a rear edge thereof is detected, then a step P13 carries out a reading of the remaining image data of the data sheet for a prescribed period of time. And, a step P14 ejects the data sheet from the facsimile apparatus 20 after the image data reading of that data sheet is completed. A step P15 carries out again a data sheet detection, and a step P16 checks whether there is a next data sheet on the document board of the facsimile apparatus 20. If a next data sheet is on the document board, then the step P7 above is taken to carry out a data sheet transport and the subsequent steps P8 through P15 are performed. When all the data sheets on the document board are detected and the image data reading is completed, a step P17 makes the facsimile apparatus 20 return back to a ready condition, and the above described flow of the operation of the facsimile apparatus 20 is ended.

In the case of the operation flow as shown in FIG. 12, the light source 27 is turned ON only when the start button of the facsimile apparatus 20 is depressed, and therefore it is possible to prevent the light emitting elements from deteriorating in an early stage. In this case, it is possible to turn on first the light emitting elements in the data sheet detection group 27b, 27c or 27d of the light source 27, and later the light emitting elements in the image reading group 27a may be turned on when the front edge of the data sheet is detected in the step P9. This will achieve more reliably a prevention of early deterioration of the light emitting elements in the light source 27.

Figure 13:
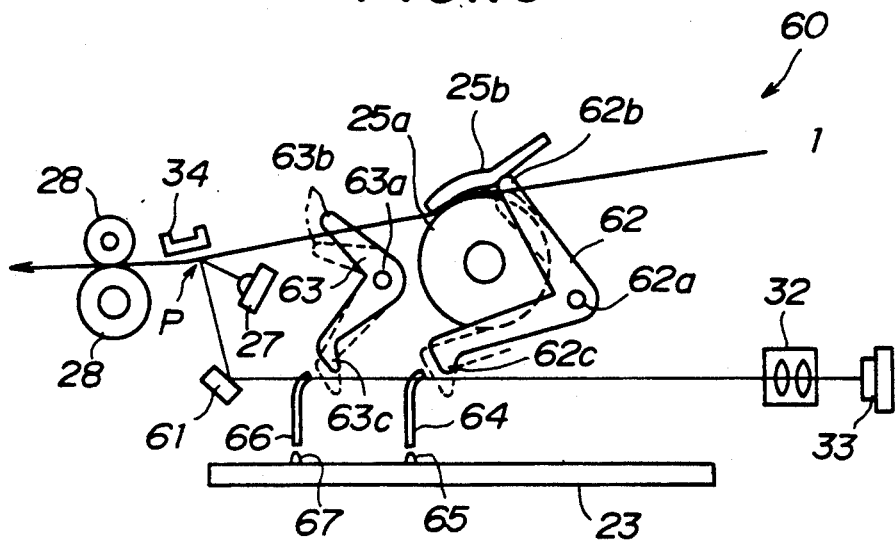
FIG. 13 is a view showing a modified example of a document reading apparatus according to the present invention.
Figure 14:
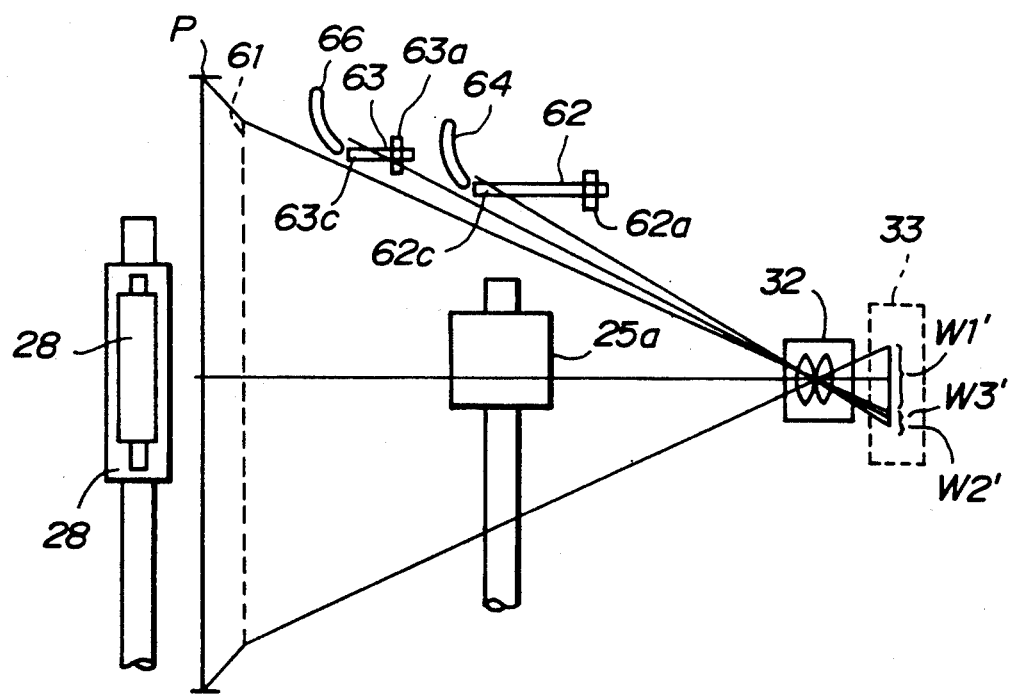
FIG. 14 is a view showing an optical part of the document reading apparatus shown in FIG. 13.

Next, a description will be given of a second embodiment of a document reading apparatus according to the present invention, with reference to FIGS. 13 through 15A to 15E. In FIGS. 13 and 14, those parts which are the same as the document reading apparatus shown in FIGS. 2 and 3 are designated by the same reference numerals, and a description thereof will be omitted.

In the document reading apparatus 60 shown in FIG. 13, a data sheet placed on the document board is fed one by one along a sheet transport path by means of a transport roller 25a and a separator 25b, an image data of the data sheet is read at a position P, and then the data sheet is ejected out of the document reading apparatus 60 by a pair of ejection rollers 28. A light beam emitted from the light source 27 is irradiated to the data sheet at the position P, and a light beam reflected from the data sheet is further reflected by a mirror 61, passes through the lens 32, and is irradiated to the photoconductive element array 33. Similar to the above first embodiment, the photoconductive element array 33 is formed by a plurality of photoconductive elements arranged in a row one another. The photoconductive element array 33 in this embodiment is formed to have a width that is greater than a width in which the light beam reflected from the data reading range W1 of the retaining board 34 is irradiated to the photoconductive element array 33, by a prescribed length. And, the photoconductive element array 33 is divided into three different ranges, the image reading range W1', the data sheet detection range W2' and the sheet edge detection range W3'.

The document reading apparatus 60 comprises a data sheet detection actuator 62 and a sheet edge detection actuator 63. The data sheet detection actuator 62 is rotatably supported by a supporting pin 62a, and an end portion 62b of the data sheet detection actuator 62 projects over the document board and an end portion 62c thereof projects over the optical path along which a light beam reflected from the data sheet at the position P passes, as shown in FIG. 14. And, the data sheet detection actuator 62 is actuated by a spring (not shown) toward a direction in which the end portion 62b is so placed to project over the sheet transport path, and is arranged so as to be stopped at a predetermined position by a stopper (not shown). The sheet edge detection actuator 63 is provided at a position between the position P and the transport roller 25a, and is rotatably supported by a supporting pin 63a. An end portion 63b of the sheet edge detection actuator 63 projects over a sheet transport path along which a data sheet is transported. And, an end portion 63c of the sheet edge detection actuator 63 projects over the optical path in which a light beam reflected from the data sheet at the position P passes. The sheet edge detection actuator 63 is actuated by a spring (not shown) toward a direction in which the end portion 63b is so placed to project over the sheet transport path, and is arranged so as to be stopped at a predetermined position by a stopper (not shown).

As shown in FIGS. 13 and 14, a light guide 64 has an inlet opening and an outlet opening, the outlet opening being directed to the end portion 62c of the data sheet detection actuator 62, the inlet opening directed to a light source 65 provided for data sheet detection. Therefore, a light beam emitted from the light source 65 is irradiated to the end portion 62c of the data sheet detection actuator 62 by means of the light guide 64. And, as shown in FIG. 14, this light beam is irradiated to the photoconductive element array 33 through the lens 32, and especially to the data sheet detection range W2' of the photoconductive element array 33. In addition, a light guide 66 has an inlet opening and an outlet opening, the outlet opening being directed to the end portion 63c of the sheet edge detection actuator 63, the inlet opening directed to a light source 67 provided for sheet edge detection. Therefore, alight beam emitted from the light source 67 is irradiated to the end portion 63c of the sheet edge detection actuator 63 by means of the light guide 66. And, as shown in FIG. 14, this light beam is irradiated to the photoconductive element array 33 through the lens 32, and especially to the sheet edge detection range W3' of the photoconductive element array 33. The data sheet detection light source 65 and the sheet edge detection light source 67 described above are provided on a substrate of the control unit 23.

Next, a description will be given of the operation of the second embodiment of the document reading apparatus. As shown in FIG. 14, a light beam which is emitted form the light source 27 is reflected on the data sheet at the position P, further reflected on the mirror 61, passes through the lens 32, and is irradiated to the image reading range W1' of the photoconductive element array 33. A light beam which is emitted from the light source 65 passes through the light guide 64, passes by the end portion 62b of the data sheet detection actuator 62, and is irradiated to the data sheet detection range W2' of the photoconductive element array 33. And, a light beam which is emitted form the light source 67 passes through the light guide 66, passes by the end portion 63c of the sheet edge detection actuator 63, and is irradiated to the sheet edge detection range W3' of the photoconductive element array 33.

Figure 15A:
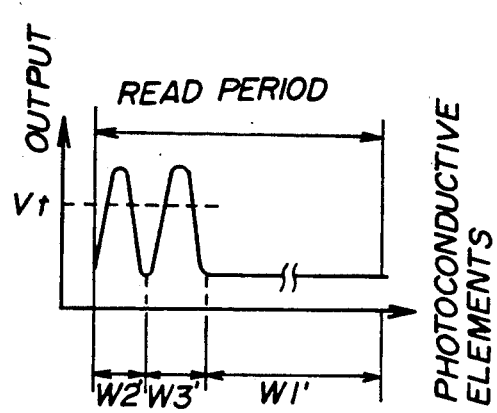
FIG. 15A through 15E are diagrams for explaining a number of output signals outputted from a photoconductive element array at a timing by which a data sheet is placed on the facsimile and at timings by which a front edge of the data sheet and a rear edge thereof are detected.

It is assumed that the data sheet detection light source 65 and the sheet edge detection light source 67 are turned ON when the power switch of the document reading apparatus 60 is depressed. When no data sheet is placed on the document board, the signals (video signals) which are outputted form the photoconductive element array 33 in the ranges W1', W2' and W3' are as illustrated in FIG. 15A. The signals outputted from the ranges W2' and W3' of the photoconductive element array 33 has a high voltage, while the signal outputted rom the range W1' thereof has a low voltage. Accordingly, the signals outputted from the ranges W2' and W3' are compared with a predetermined voltage Vt, and if they are greater than this predetermined voltage Vt, it can be determined that there is no data sheet on the data sheet plate and in the sheet transport path. When there is no data sheet, the end portion 62c of the data sheet detection actuator 62 is actuated by the spring toward the document board and the end portion 63c of the sheet edge detection actuator 63 is actuated by the spring toward the sheet transport path. And, a light beam emitted from the light source 65 is not screened by the end portion 62c of the actuator 62 and alight beam emitted from the light source 67 is not screened by the end portion 63c of the actuator 63. Therefore, the signals outputted from the data sheet detection range W2' and the sheet edge detection range W3' of the photoconductive element array 33 indicate a voltage that is higher than a predetermined voltage Vt, as shown in FIG. 15A.

Figure 15B:
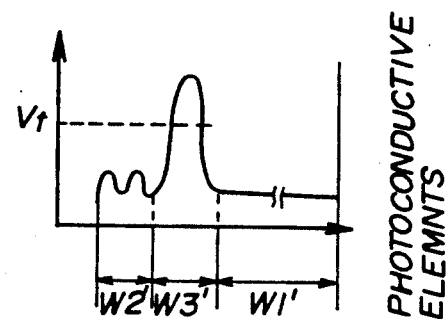

When a data sheet is placed on the document board, the data sheet detection actuator 62 is rotated around the supporting pin 62a by that data sheet and a light beam emitted from the light source 65 is screened by the end portion 62c of the actuator 62. Therefore, a signal outputted from the data sheet detection range W2' o the photoconductive element array 33 indicates a voltage that is lower than a predetermined voltage Vt, as shown in FIG. 15B, and it can be determined that a data sheet is on the document board.

Figure 15C:
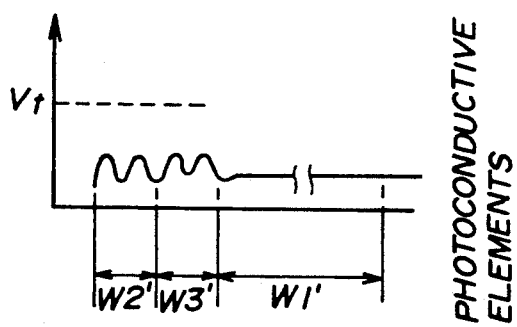
Figure 15D:
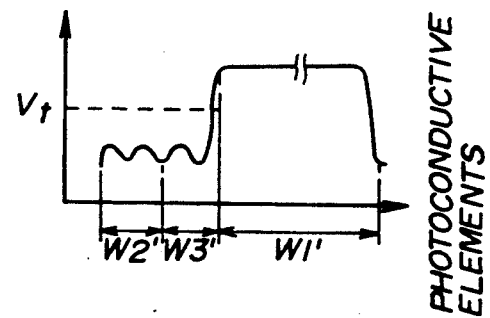

As the data sheet is transported from the document board to the sheet edge detection actuator 63, the sheet edge detection actuator 63 is rotated around the supporting pin 63a by the data sheet, and a light beam emitted from the light source 67 is screened by the end portion 63c of the actuator 63. Therefore, a signal outputted from the sheet edge detection range W3' of the photoconductive element array 33 indicates a voltage that is lower than a predetermined voltage Vt, as shown in FIG. 15C, and it can be determined that a front edge of the data sheet is detected. The facsimile apparatus 60 starts an image data reading of the data sheet after the data sheet reaches the position P in the sheet transport path. During the image data reading, a signal outputted from the image reading range W1' of the photoconductive element array 33 indicates a voltage as shown in FIG. 15D.

Figure 15E:
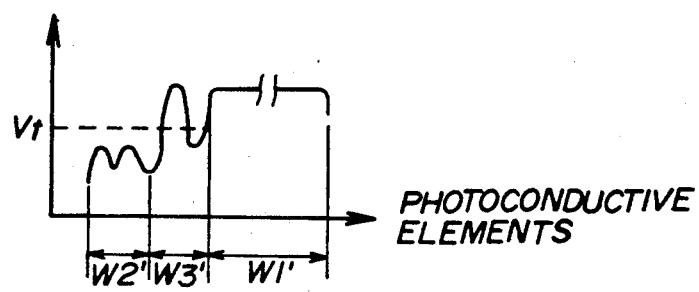

As the data sheet is further transported so that the rear edge of the data sheet passes by the sheet edge detection actuator 63, the sheet edge detection actuator 63 is no longer moved by the data sheet and is rotated in the reverse direction back to the sheet transport path owing to an actuating action by the spring. Thus, a light beam emitted from the sheet edge detection light source 67 is not screened by the end portion 63c of the sheet edge detection actuator 63 and is irradiated to the sheet edge detection range W3' of the photoconductive element array 33. As a result, a signal outputted from the range W3' of the photoconductive element array 33 indicates a voltage that is higher than a predetermined voltage Vt, as shown in FIG. 15E, and it can be determined that the rear edge of the data sheet is detected. In the present embodiment, the photoconductive element array 33 which is divided into the three ranges W1', W2' and W3' is used, and it is possible to commonize connecting wires and control circuits with the light emitting elements for reading image data, allowing a simplified construction of the document reading apparatus as well as a reduction of the manufacturing cost. And, in the present invention, the image reading light source 27, the data sheet detection light source 65 and the sheet edge detection light source 67 are provided separately in the document reading apparatus, and therefore the degree of freedom to design the document reading apparatus can be increased. In addition, although it is necessary to make use of a mirror having a greater width when a light beam reflected on the retaining board 34 is used to detect the presence of a data sheet or a front edge or rear edge of the data sheet, it is possible for the document reading apparatus of this embodiment to be built into a smaller size because a mirror of a smaller size can be used.

Figure 16:
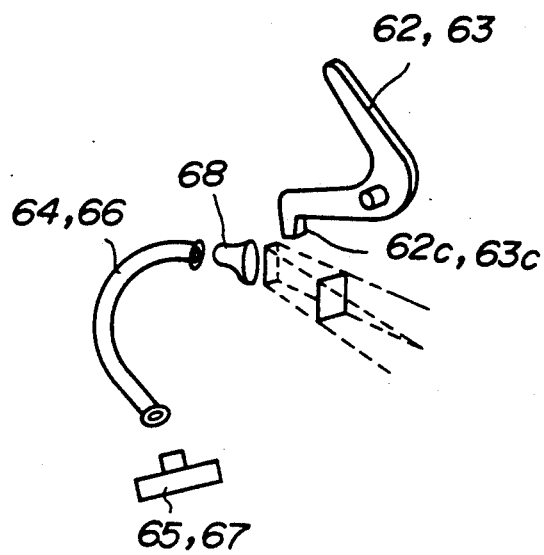
FIG. 16 is a view showing a modified example of a light guide which is used for detecting a data sheet on a document board and an edge of the data sheet.

FIG. 16 shows a point-to-line converting light guide 68 which may be provided within the document reading apparatus 60 shown in FIGS. 13 and 14 at a position between the data sheet detection actuator 62 and the light guide 64 or at a position between the sheet edge detection actuator 63 and the light guide 66. With the point-to-line converting light guide 68 used, a light beam irradiated from the light guide 64 to the actuator 62 and a light beam irradiated from the light guide 66 to the actuator 63 may be enlarged in a direction perpendicular to the optical surface on which a light beam from the light source 27 is reflected on the data sheet at the position P along the sheet transport path. This point-to-line conversion light guide 68 has an inlet rotational symmetrical cross-section, and this point-to-line conversion light guide 68 has an inlet opening from which a light beam supplied rom the light guide 64, 66 is entered efficiently. The point-to-line conversion light guide 68 has an outlet opening with a longitudinal section enlarged in a direction perpendicular to the optical path in which a light beam from the light source 27 passes. Therefore, adjustment of an image reading position allows a light beam from the light source 65, 67 to be irradiated accurately to the photoconductive element array 33 even when a location position of the photoconductive element array 33 is adjusted vertically. Thus, it is unnecessary to adjust the optical axis in which a light beam from the data sheet detection light source and the sheet edge detection light source is irradiated. Consequently, this makes the adjustment work more simple, and it is possible to provide the document reading apparatus 60 which can detect appropriately the presence of a data sheet and a front edge or rear edge of the data sheet, and the manufacturing cost of the document reading apparatus can be reduced efficiently.

Figure 17:
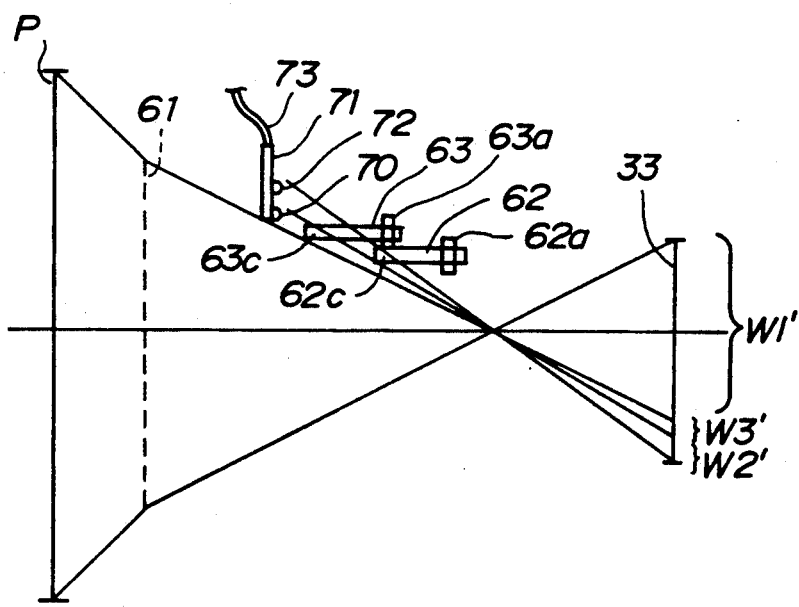
FIG. 17 is a view showing a construction of another modified example of a document reading apparatus according to the present invention.

FIG. 17 shows a modified example of the data sheet detection light source and the sheet edge detection light source. In FIG. 17, those parts which are the same as the second embodiment of the document reading apparatus as shown in FIGS. 13 and 14 are designated by the same reference numerals, and a description thereof will be omitted. As shown in FIG. 17, a data sheet detection light source 70 and a sheet edge detection light source 72 are mounted on a printed circuit board 71, and a harness 73 is connected to these light sources 70 and 72 and a power is supplied to these light sources 70 and 72 via the harness 73. The data sheet detection light source 70 supplies a light beam which is directed to the end portion 62c of the actuator 62 and irradiated to the rang W2' of the array 33. The sheet edge detection light source 72 supplies a light beam which is directed to the end portion 63c of the actuator 63 and irradiated to the range W3' of the array 33. Thus, when the light sources 70 and 72 are provided with no light guides 64 and 66 used, it is possible to reduce the manufacturing cost of the document reading apparatus.

Figure 18:
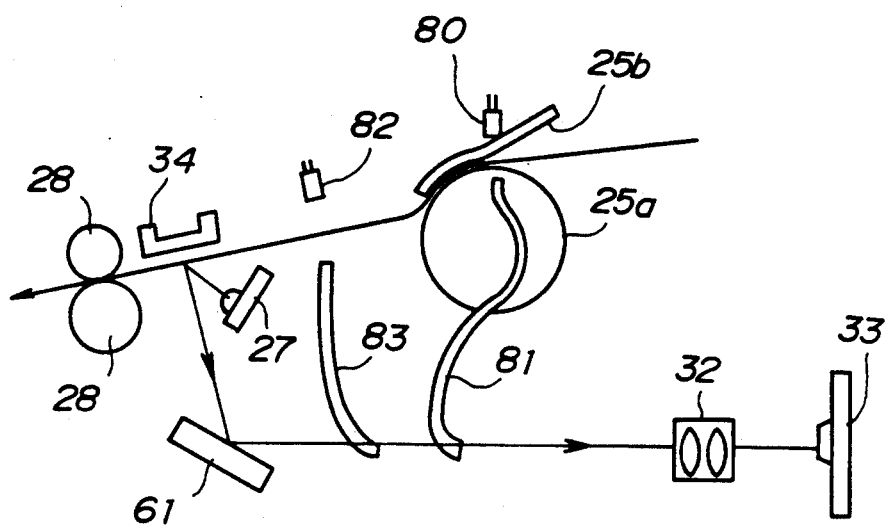
FIG. 18 is a view showing a construction of another modified example of the document reading apparatus.

FIG. 18 shows another modified example of the data sheet detection light source and the sheet edge detection light source. In FIG. 18, those parts which are the same as the second embodiment of the document reading apparatus as shown in FIGS. 13 and 14 are designated by the same reference numerals, and a description thereof will be omitted. As shown in FIG. 18, a data sheet detection light source 80 is provided in the vicinity of the separator 25b of the document board. A light guide 81 which is provided in the vicinity of the sheet transport roller 25a has an inlet opening for receiving a light beam from the data sheet detection light source 80, and has an outlet opening for directing the light beam from the light source 80 to the lens 32. Thus, the light beam passing the lens 32 is directed to the range W2' of the photoconductive element array 33. A light guide 82 which is provided between the document board and the retaining board 34 has a inlet opening for receiving a light beam from the sheet edge detection light source 82 and an outlet opening for directing the light beam from the light source 82 to the lens 32. The light beam passing the lens 32 is directed to the range W3' of the photoconductive element array 33. Accordingly, with neither the data sheet detection actuator 62 nor the sheet edge detection actuator 63 being used, it is possible to detect the presence of a data sheet on the document board by checking whether a light beam supplied from the light source 80 is cut off by the data sheet being transported along the sheet transport path. Also, it is possible to detect a front edge or rear edge of the data sheet by checking whether a light beam supplied from the light source 82 is cut off by the front edge or rear edge of the data sheet. Since the data sheet detection actuator 62 and the sheet edge detection actuator 63 need not be provided, it is possible to make the size of a document reading apparatus smaller, and the degree of freedom to design the document reading apparatus will be increased.

Figure 19:
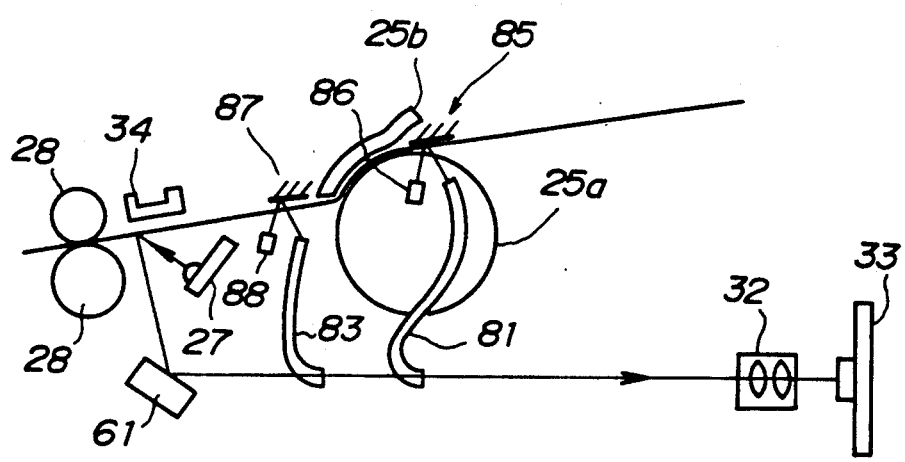
FIG. 19 is a view showing a construction of another modified example of the document reading apparatus.

FIG. 19 shows another modified example of the data sheet detection light source and the sheet edge detection light source. In FIG. 19, those parts which are the same as the second embodiment of the document reading apparatus shown in FIGS. 13 and 14 are designated by the same reference numerals, and a description thereof will be omitted. As shown in FIG. 19, a reflection board 85 and a data sheet detection light source 86 are provided in the vicinity of the separator 25b of the document board. A light guide 81 is also provided in the vicinity of the sheet transport roller 25a. A light beam from the data sheet detection light source 86 is reflected on the reflection plate 85, and a light beam reflected from the reflection board 85 is directed to the light guide 81. The light guide 81 has an inlet opening for receiving the light beam from the reflection board 85, and has an outlet opening for directing the light beam to the lens 32. The light beam passing the lens 32 is directed to the range W2' of the photoconductive element array 33. In addition, a reflection board 87 and a sheet edge detection light source 88 are provided between the document board and the retaining board 34. A light beam from the sheet edge detection light source 88 is reflected on the reflection board 87 and is directed to a light guide 83. The light guide 83 has an inlet opening for receiving the light beam from the reflection board 87, and has an outlet opening for directing the light beam from the light source 88 to the lens 32. The light beam passing the lens 32 is directed to the range W3' of the array 33. Accordingly, even when neither the data sheet detection actuator 62 nor the sheet edge detection actuator 63 is used, it is possible to detect the presence of a data sheet on the document board by checking whether a light beam supplied from the light source 86 is cut off by the data sheet being transported along the sheet transport path. Also, it is possible to detect a front edge or rear edge of the data sheet by checking whether a light beam supplied from the light source 88 is cut off by the front edge or rear edge of the data sheet. Similar to the above described example shown in FIG. 18, it is possible to make the size of a document reading apparatus smaller, and the degree of freedom to design the document reading apparatus will be increased.

Figure 20:
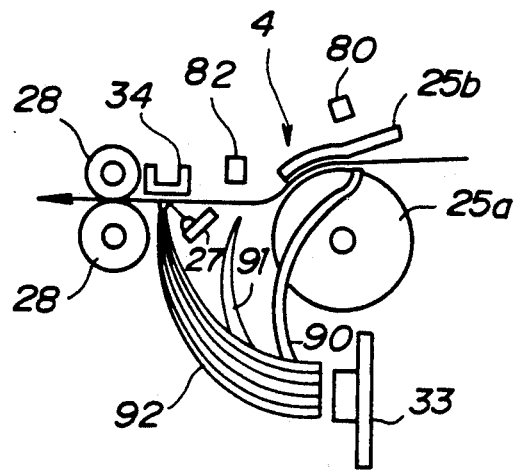
FIG. 20 is a view showing a construction of another modified example of the document reading apparatus.

FIG. 20 shows a modified example of the document reading apparatus according to the present invention. In this example, no optical lens is used in the document reading apparatus and a number of light guides 90, 91 and 92 are used instead. In FIG. 20, those parts which are the same as the embodiment shown in FIG. 18 are designated by the same reference numerals, and a description thereof will be omitted. As shown in FIG. 20, the data sheet detection light source 80 is provided in the vicinity of the separator 25b. The light guide 90 is provided in the vicinity of the sheet transport roller 25a has an inlet opening for receiving a light beam from the light source 80, and has an outlet opening for directing the light beam from the light source 80 to the photoconductive element array 33. The light beam from the outlet opening of the light guide 90 is directed to the range W2' of the array 33. The sheet edge detection light source 82 is provided between the retaining board 34 and the date sheet plate, and a light beam emitted from the light source 82 is supplied to the light guide 91. The light guide 91 has an inlet opening for receiving the light beam from the light source 82, and has an outlet opening for directing the light beam from the light source 82 to the photoconductive element array 33. The light beam from the outlet opening of the light guide 91 is directed to the range W3' of the array 33. In addition, the light guide 92 is provided in the vicinity of the retaining board 34 for reading an image data from the data sheet. This light guide 9 has an inlet opening for receiving a light beam reflected from the data sheet, and an outlet opening for direction the light beam reflected from the data sheet to the photoconductive element array 33. The light beam from the light guide 92 is directed to the range W1' of the array 33 as shown in FIG. 20. And, for example, a line-to-circle conversion type or line-to-surface conversion type light guide may be used for the above described light guides 90, 91 and 92 in this embodiment.

Therefore, it is possible to detect the presence of a data sheet on the document board and a front edge or rear edge of the data sheet being transported by checking whether a light beam supplied from the light source 80 or 82 is cut off by the data sheet. It is possible to irradiate the light beam from the light source directly to the photoconductive element array 33 by the light guides 90 and 91, and it is possible to irradiate the light beam reflected from the data sheet directly to the photoconductive element array 33 by the light guide 92. Since an optical lens may be omitted, it is possible to make the size of the document reading apparatus smaller, and the degree of freedom to design the document reading apparatus will be increased.

In the above examples shown in FIGS. 18 through 20, the locations of the data sheet detection light source and of the sheet edge detection light source and the locations of the inlet openings of the light guides are not limited to those of the examples shown in FIGS. 18 to 20, and modifications may be made to change the locations to different ones.

Next, a description will be given of a second embodiment of a document reading apparatus, with reference to FIGS. 21 through 25.

Figure 21:
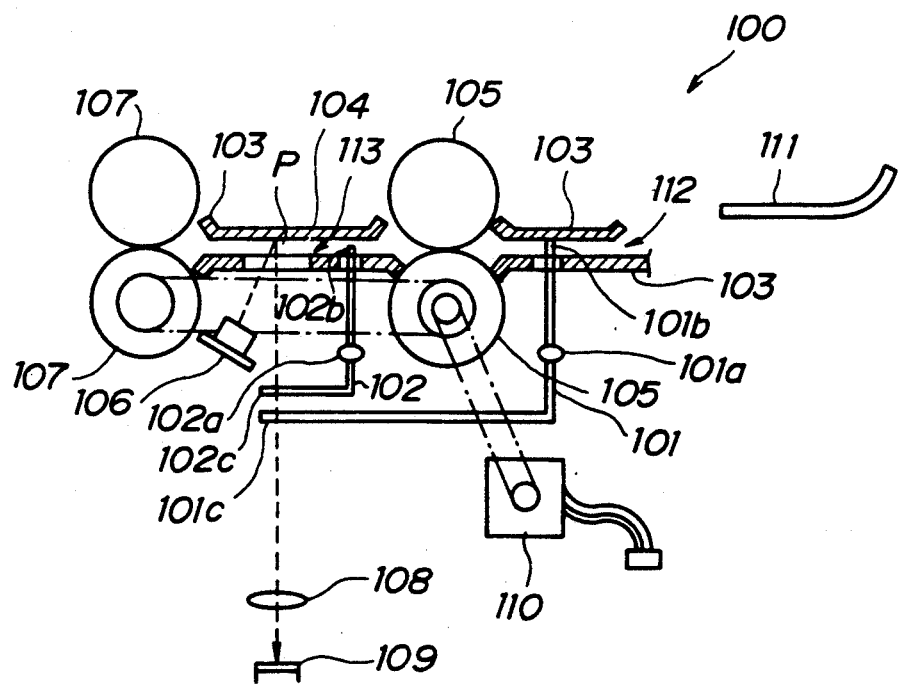
FIG. 21 is a view showing a second embodiment of a document reading apparatus according to the present invention.

As shown in FIG. 21, a document reading apparatus 100 generally has a data sheet detection actuator (data sheet detection part) 101, a sheet edge detection actuator (sheet edge detection part) 102, a data sheet guide board 103, a data sheet retaining board 104, a pair of transport rollers 105, a light source 106, a pair of ejection rollers 107, a lens 108, a photoconductive element array (photoconductive part) 109 and a stepper motor 110. A document board 112 in which a plurality of data sheets 111 are set is formed by the data sheet guide board 103, and a sheet transport path 113 along which the data sheet 111 is transported is formed by the data sheet retaining board 104. The data sheet detection actuator 101 is rotatably supported by a supporting pin 101a, and a detecting edge 101b of the actuator 101 projects over the document board 112. The data sheet detection actuator 101 has an end portion 101c which is located opposite to the detecting edge 101b, and this end portion 101c projects over an optical path which will be described below. The data sheet detection actuator 101 is rotated around the supporting pin 101a when the detection edge 101b is moved by the data sheet 111. A data sheet 111 at the lowermost part of the plurality of data sheets which are placed in the document board 112 is transported one by one along the sheet transport path 113 to a reading position P by the transport rollers 105. A light beam emitted from the light source 106 is irradiated to the data sheet 111 at the reading position P, and a reading of an image data from the image sheet is carried out. After the reading is carried out, the data sheet is ejected out of the document reading apparatus 100 by the ejection rollers 107.

The sheet edge detection actuator 102 is rotatably supported by a supporting pin 102a, and a detecting edge 102b of the actuator 102 projects over the document board 112. The sheet edge detection actuator 102 has an end portion 102c which is located opposite to the detecting edge 102b, and this end portion 102c projects over an optical path which will be described below. The sheet edge detection actuator 102 is rotated around the supporting pin 102a when the detection edge 102b is moved by the data sheet 111 being transported to the reading position P. A light beam emitted from the light source 106 is directed to the data sheet 111 at the reading position P in the sheet transport path 113, a light beam reflected from the data sheet 111 is directed to the lens 108, and a light beam passing the lens 108 is irradiated to the photoconductive element array 109. At a position where the light beam from the light source 106 is directed, the data sheet retaining board 10 is provided. This data retaining board 104 is provided at a position opposite to the light source 106 with relation to the sheet transport path 113, and has a surface confronting the light source 106 which is painted in white for shading correction. And, this data retaining board 104 has a width in the main scan direction that is greater than the maximum sheet width of the data sheet 111.

Figure 22:
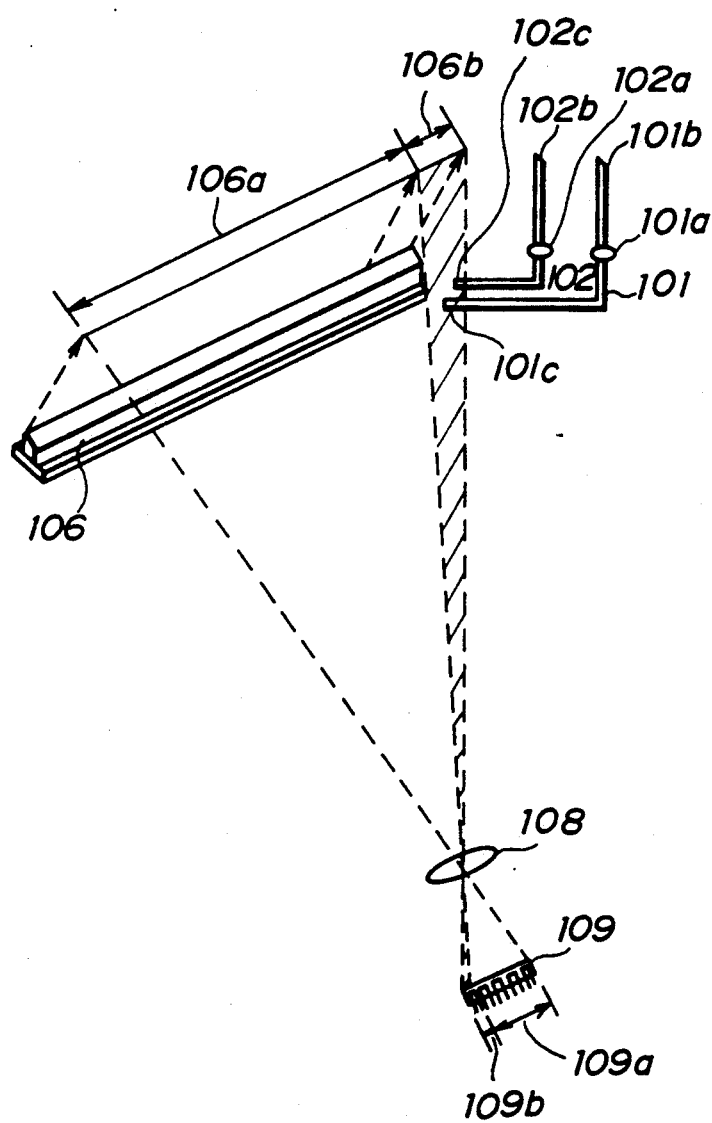
FIG. 22 is a view showing major parts of the document reading apparatus of FIG. 21.

The light source 106 uses a plurality of light emitting elements (for example, light emitting diodes LEDs) which are arranged separately one another in parallel to a main scan direction. As shown in FIG. 22, these light emitting elements of the light source 106 are divided into two separate groups, an image reading group 106a for supplying a light beam which is scanned over the retaining board 104 in a range thereof corresponding to the maximum width of the data sheet, and a detection group 106b for supplying a light beam which is irradiated to the retaining board 104 in a range located outside the maximum reading range of the data sheet for detecting the data sheet. FIG. 23 shows an example of a control circuit for controlling the light emitting elements of the light source which are made up of the image reading group 106a and the detection group 106b.

As described above, a charge coupled device (CCD) unit for a B4 size facsimile machine is less expensive per unit length than that for an A4 size facsimile machine. By making use of a B4 size CCD unit as the photoconductive element array 109 in the A4 size facsimile machine, it is possible to provide a facsimile apparatus which is less expensive and has a number of CCD devices corresponding to the image reading group 109a (equivalent to the maximum reading width of a A4 size sheet) as well as a number of CCD devices corresponding to the detection group 109b. For example, when a facsimile apparatus has a resolution of 8 lines per millimeter, 2048 picture elements can be formed by the B4 size CCD unit. In the case of the A4 size facsimile, only 1728 picture elements are required for the image data reading group 109a with respect to the width of an A4 size data sheet, and the remaining 320 picture elements of the B4 size CCD unit may be used for the detection group 109b. Therefore, such a photoconductive element array 109 having a width of photoconductive elements of the image data reading group 109a as well as a width of photoconductive elements of the detection group 109b can be produced with ease and low cost. And, wire connections and circuit elements for the photoconductive element array 109 may be commonized with those used in the existing photoconductive element array, and it is possible to make the structure of the document reading apparatus simple. In addition, the cost for manufacturing the document reading apparatus of the invention is lower than the cost for manufacturing the conventional document reading apparatus using a photocoupler for data sheet detection and a photocoupler for sheet edge detection.

As shown in FIG. 22, the end portion 101c of the data sheet detection actuator 101 and the end portion 102c of the sheet edge detection actuator 102 project over an optical path in which a light beam from the detection group 106b of the light source 106 is irradiated to the detection group 109b of the photoconductive element array 109 through the lens 108. When the detecting edge 101b of the data sheet detection actuator 101 and the detecting edge 102b of the sheet edge detection actuator 102 ar not moved and project over the optical path, the light beam from the light source 106 is cut off by the end portions 101c and 102c. When the detecting edges 101b and 102b are moved by the data sheet and come out of the optical path, the light beam is not cut off and irradiated to the detection group 109b of the photoconductive element array 109.

The control circuit 120 shown in FIG. 23 generally has a detecting part 121, a drive part 122, an on-time period control part 123 and a driver 124. A signal Vo from the photoconductive element array 109 is supplied to the detecting part 121. When the light beam from the light source 106 is cut off by the data sheet detection actuator 101 or by the sheet edge detection actuator 102, the signal Vo is in a state as shown in FIG. 24A. The signal Vo has a detection range and a reading range, and this signal Vo showing a high level in the reading range due to the irradiation of the light beam to the image reading group 109a of the array 109, and including in the detection range a signal part S1 caused by the actuator 101 and a signal part S2 caused by the actuator 102, both the signal parts S1 and S2 indicating a low level due to the shading of the light beam by the actuator 101 or the actuator 102. On the other hand, when the light beam from the light source 106 is not cut off by the actuator 101 or the actuator 102 due to the presence of a data sheet, the signal Vo is in a state as shown in FIG. 24B. As shown in FIG. 24B, the signal Vo indicates a high level in the reading range as well as in the detection range with no low level such as the signal part S1 and S2 shown in FIG. 24A. The detecting part 121 detects the actions of the data sheet detection actuator 101 and the sheet edge detection actuator 102 on the basis of the signal Vo supplied from the photoconductive element array 109, and then supplies a detection signal S1D to the system control part 125 when the signal S1 caused by the actuator 101 is detected, and supplies a detection signal S2D to the system control part 125 when the signal S2 caused by the actuator 102 is detected. At the same time that the detection signal S1D is supplied, a turn-on signal LG is supplied by the detecting part 121 to the on-time period control part 123. On the basis of the turn-on signal LG supplied from the detecting part 121, the on-time period control part 123 supplies a control signal LC to the driver 124 so that the driver 124 supplies a drive signal LD to the light source 106 for controlling a driving of the light source 106. Therefore, the on-time period control part 123 can control an on-time period for which a control signal LC is supplied to the driver 124, and control an on-time period for which the light source is turned ON by means of the driver 124.

The drive part 122 supplies a shift pulse oSH, a set of transfer pulses o1, o2 and a reset pulse oR to the photoconductive element array 109, and supplies a signal LT to the detecting part 121. And, in synchronism with the shift pulse oSH supplied to the photoconductive element array 109, the drive part 122 supplies an on-time period signal LDT to the on-time period control part 123. Receiving the signal from the drive part 122, the photoconductive element array 109 generates an electric signal when a light beam from the light source 106 is irradiated to the reading group 109a and the detection group 109b of the array 109, so that the signal Vo is outputted to the detection part 121 of the control circuit.

When the document reading apparatus 100 is in a ready state and no data sheet on the document board, the data sheet detection actuator 101 and the sheet edge detection actuator 102 are not moved. As shown in FIG. 22, the end portion 101c of the actuator 101 and the end portion 102c of the actuator 102 are located in the optical path along which the light beam from the detection group 106b of the light source 106 is directed to the detection range 109b of the photoconductive element array 109. The light beam irradiated to the range 109b is cut off by the end portion 101c of the actuator 101 or the end portion 102c of the actuator 102. Thus, the signal Vo supplied from the photoconductive element array 109 indicates, as shown in FIG. 24A, the signal part S1 caused by the end portion 101c of the actuator 101 and the signal part S2 caused by the end portion 102c of the actuator 102. When the signal Vo having the signal part S1 and S2 is received from the photoconductive element array 109, the detecting part 121 supplies the detection signal S1D and the detection signal S2D to the system control part 125. On the basis of the values indicated by the detection signals S1D and S2D from the detecting part 121, the system control part 125 can determine whether the data sheet 11 is placed on the document board 112 and whether the data sheet is transported to a predetermined position along the transport path. Thus, an image reading control can be performed by the system control part 125 on the basis of the detection signals SID and S2D from the detecting part 121.

Figure 25:
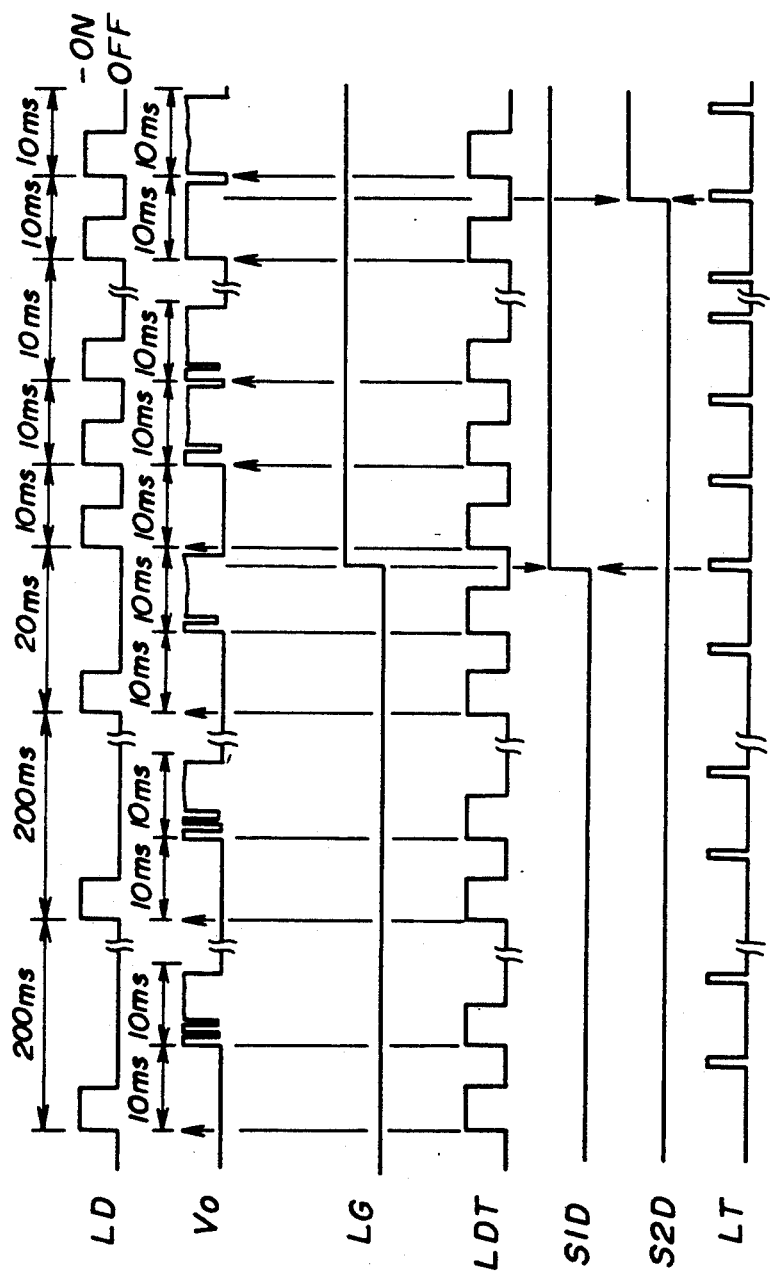
FIG. 25 is a timing chart for explaining the operation of an on-time period control of the light source on the basis of the signal outputted from the photoconductive element array.

As shown in FIG. 25, the turn-on signal LG, outputted from the detecting part 121 to the on-time period control part 123 in synchronism with the detection signal S1D supplied to the system control part 125, changes from a low level to a high level in a synchronous manner with a change of the detection signal S1D. In this ready state of the document reading apparatus 100, the on-time period control part 123 supplies to the driver 124 the control signal LC which has an on-time period greater than a normal on-time period required during a normal image reading operation. In accordance with the control signal LC received from the on-time period control part 123, the driver 124 supplies to the light source 106 the drive signal LD having an on-time period greater than the normal on-time period so that the light source 106 is turned ON.

When the data sheet 111 is placed on the document board 112, the detecting edge 101b of the data sheet detection actuator 101 is moved by the data sheet 111 on the document board 112 and the data sheet detection actuator 101 is rotated around the supporting pin 101a. Then, the end portion 101c of the data sheet detection actuator 101 comes out of the optical path, the light beam from the detection group 106b of the light source 106 is not cut off by the end portion 101b of the actuator 101. Thus, the signal Vo from the photoconductive element array 109 has, as shown in FIG. 25, no signal part S1 indicating a low level in the detection range, caused by the data sheet detection actuator 101. When the detection signal S1D is generated by the detection part 121, the turn-on signal LG supplied to the on-time period control part 123 changes from a low level to a high level. When the turn-on signal LG changes from the low level to the high level, the on-time period control part 123 supplies the control signal LC to the driver 124, the control signal LC having an on-time period required for a normal reading operation which is smaller than an on-time period used for a ready state of the data reading apparatus 100. For example, if the on-time period of the control signal LC used for a ready state of the document reading apparatus 100 is 200 ms, the control signal LC is changed to have 10 ms as the on-time period required for a normal reading operation when the turn-on signal LG supplied to the on-time period control part 123 changes from a low level to a high level. As a result, it is possible for the document reading apparatus to have a turn-on period of the light source having an on-time period in the ready state 20 times greater than the on-time period required for image reading operation, thereby preventing the light source from deteriorating early and allowing the light source to have a longer service life. And, it is possible to adjust the control signal used in the document reading apparatus so as to have an on-time period required for image reading operation.

When the data sheet 111 is transported along the transport path 113 and the detecting edge 102b of the sheet edge detection actuator 102 is moved by the data sheet, the sheet edge detection actuator 102 is rotated around the supporting pin 102a and the end portion 102c of the actuator 102 comes out of the optical path. The signal Vo outputted from the photoconductive array 33 in this case is as shown in FIGS. 24B and 25. As shown, the signal Vo has no signal parts S1 and S2, caused by the actuators 101 and 102, indicating a low level in the detection range. Then, an image reading of the data sheet 111 is started by the system control part 125.

As described above, since the transport of the data sheet is monitored and an on-time period of the light source is suitably controlled according to this second embodiment of the present invention, it is possible to prevent early deterioration of the light source and allow a longer life of the light source. Especially, in this second embodiment of the document reading apparatus, a longer on-time period of the light source is used until the data sheet 111 on the document board 112 is detected with the data sheet detection actuator 101. And, when the data sheet is detected there, the on-time period of the light source is changed to a shorter one during an image reading operation. Therefore, the detection of the data sheet by means of the actuator 101 can be carried out adequately, which does not require a high detection accuracy. And the detection of the front edge or rear edge of the data sheet by means of the actuator 102 can also be carried out suitably, so that the image reading operation of the data sheet can be started accurately.

Next, a description will be given of a third embodiment of a document reading apparatus according to the present invention, with reference to FIGS. 26 through 36.

Figure 26:
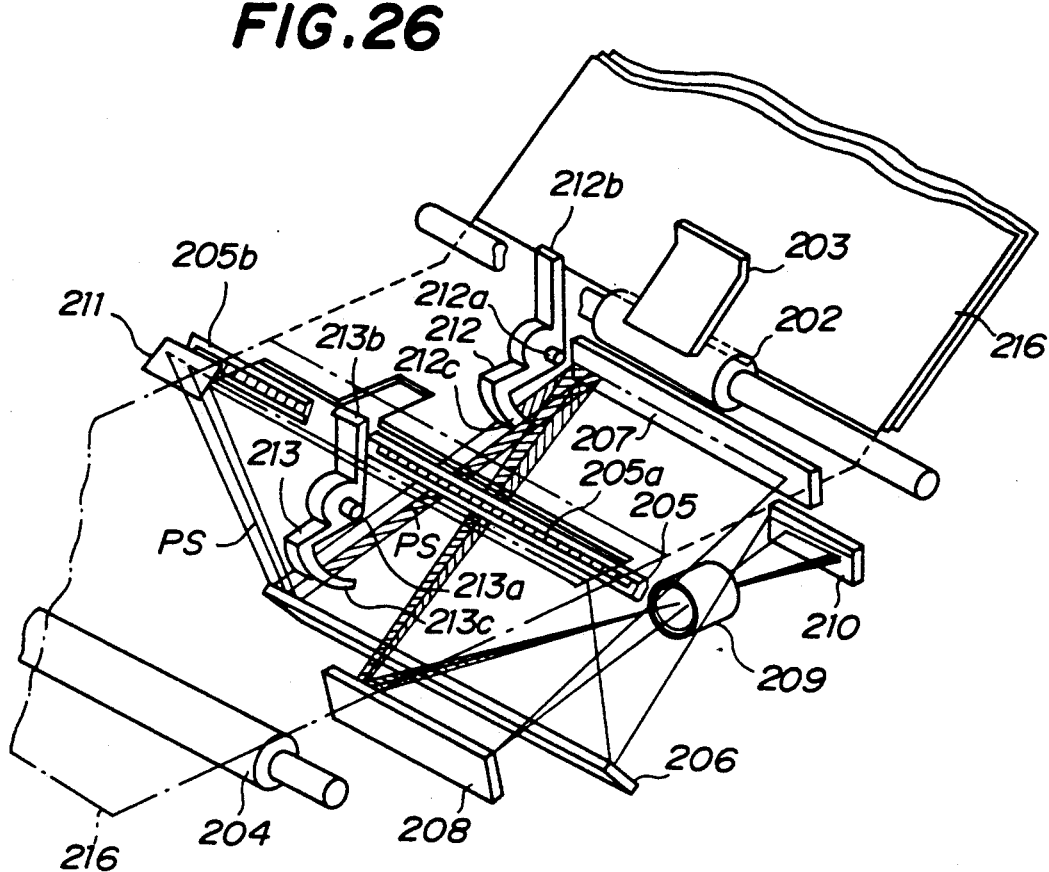
FIG. 26 is a perspective view showing the construction of a third embodiment of the document reading apparatus according to the present invention.
Figure 27:
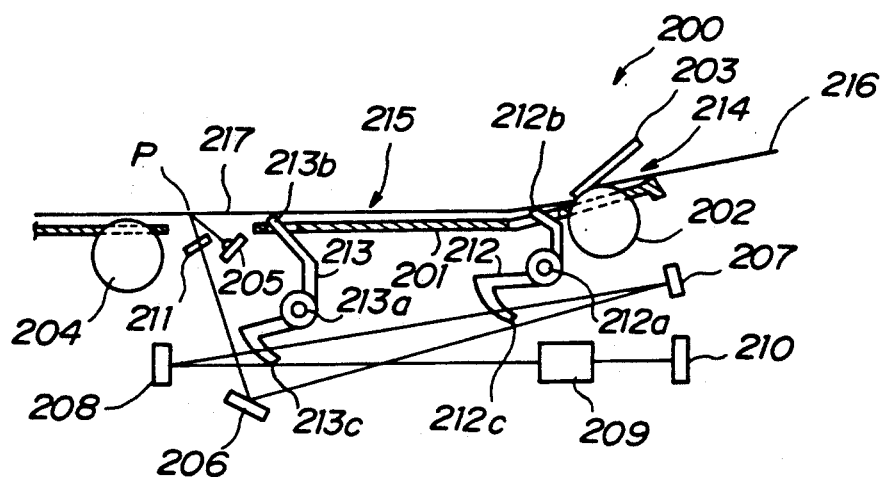
FIG. 27 is a sectional view showing the third embodiment of the document reading apparatus of FIG. 26.

FIGS. 26 and 27 show a construction of the third embodiment of the document reading apparatus according to the present invention. The document reading apparatus 200 shown in FIGS. 26 and 27 generally has a data sheet guide plate 201, a roller 202, a separator 203, an injection roller 204, a light source 205, a number of mirrors 206, 207, 208, a lens 209, a photoconductive element array 210, a reflector 211, a data sheet detection actuator 212 and a sheet edge detection actuator 213. As shown in FIG. 26, a document board 204 and a sheet transport path 205 are formed with the data sheet guide plate 201. A plurality of data sheets 216 are placed on the document board 214. By means of the roller 202 and the separator 203, the data sheet 216 from the plurality of data sheets is transported one by one along the sheet transport path 215 to the reading position P. A light beam emitted from the light source 205 is directed to the data sheet 216 at the reading position P, and a light beam reflected from the data sheet 216 is directed to the mirrors 206, 207, 208. And, a light beam reflected from the mirror 208 is irradiated to the photoconductive element array 210 through the lens 209. The data sheet 216, after an image reading thereof at the reading position P is completed, is ejected by the ejection roller 204 to an ejection tray out of the document reading apparatus 200. At the reading position P, a data sheet retaining plate 217 is provided on an opposite side of the light source 205 with relation to the sheet transport path 215. One surface of the data sheet retaining plate 217, confronting the light source 205, is painted in white for the purpose of shading correction. The data sheet retaining plate 217 has a width in a main scan direction that is greater than the maximum reading width of the data sheet by a predetermined width.

The reflector 211 is provided in the vicinity of the position P on the same side as the light source 205 with relation to the sheet transport path 215. A light beam from the light source 205 is reflected on this reflector 211, and this light beam is directed to the mirrors 206, 207, 208. A light beam reflected from the mirror 208 is directed to the photoconductive element array 210 through the lens 209. One surface of the reflector 211 may be formed like a mirror, or preferably it may be painted in white or in a glossy metallic color. A light beam reflected from such a surface of the reflector 211 shown a good illuminance. Or, one surface of the reflector 211 may be formed into a fine crimp surface as shown in FIG. 28. When the reflector surface is formed into such a crimp surface, a light normally reflected from the reflector surface can be changed to a diffused light, and the use of this diffused light allows accurate detection of the data sheet by the data sheet detection actuator 212 and by the sheet edge detection actuator 213. In addition, one surface of the reflector 211 may be formed so as to have lateral recesses extending in the main scan direction, as shown in FIG. 29. When the reflector surface is formed to have such lateral recesses, a light beam reflected from the reflector surface can be made diffused light beams which are directed to several directions extending only in a sub scan direction, in other words light diffusion does not occur in the main scan direction, as shown in FIG. 30, which will allow accurate and efficient detection of the data sheet by the actuator 212 and by the actuator 213. When the reflector surface is formed so as to have such lateral recesses which are parallel and inclined at a suitable angle to the main scan direction, the use of such a reflector surface having lateral recesses being inclined will allow a slight adjustment of diffused light beams and an improved detection accuracy can be attained with the actuators 212 and 213.

The light source 205 used is formed by a plurality of light emitting elements which may be a plurality of light emitting diodes (LEDs) arranged separately from one another in a direction of the width of the data sheet, or a main scan direction, that is perpendicular to the direction of the sheet transport path. Similar to the above embodiments, the plurality of light emitting elements are divided into two groups, an image reading group 205a and a detection group 205b. The image reading group 205a of light emitting elements generate a light beam for reading an image of the data sheet, and the image reading group 205a having a width adequate for reading the data sheet having the maximum reading width. The detection group 205b of light emitting elements generate a light beam for being directed to the reflector 211.

Similar to the above embodiments, the photoconductive element array 210 is made up of charge coupled devices (CCDs), for example. In the photoconductive element array 210, a plurality of photoconductive elements are arranged in a row along the direction of the width of the data sheet which is parallel to the main scanning direction. This photoconductive element array 210 is formed so as to be wider than the width in which a light beam reflected from the data sheet retaining board 217 is irradiated, by a predetermined width. As shown in FIG. 31, the plurality of photoconductive elements of the photoconductive element array 210 are divided into two groups, an image reading group 210a for receiving a light beam reflected from the data sheet and a detection group 210b for detecting the presence of the data sheet and a front edge or rear edge of the data sheet being transported. A light beam reflected from the reading position P on the retaining board 217 is irradiated to the image reading range 210a of the photoconductive element array 210, and a light beam reflected from the reflector 211 is irradiated to the detection group 210b of the photoconductive element array 210. Although the photoconductive element array 210 is divided into two groups 210a and 210b, wire connections and circuit parts can be commonized between the photoconductive elements of these two groups. Thus, the structure of the document reading apparatus according to the present invention may be simplified and the manufacturing cost thereof is less expensive when compared with the conventional document reading apparatus having additional photocouplers for data sheet detection and sheet edge detection. And, it is possible to control independently the on-time conditions of the photoconductive elements of the image reading group 210a and the photoconductive elements of the detection group 210b. In accordance with the transport positions of the data sheet 216, the photoconductive elements of the image reading group 210a are turned ON at appropriate timings. The photoconductive elements of the detection group 210b are always turned ON when the power switch of the document reading apparatus 200 is ON, for receiving a light beam which is used for data sheet detection and sheet edge detection. And, the photoconductive elements of the detection group 210b may be built for receiving a light beam through an optical fiber which is from the indicator lamp indicating a turn-on state of the power switch of the document reading apparatus 200. Or, it is possible to make use of a light beam from a light emitting diode which is prepared separately.

The data sheet detection actuator 212 is rotatably supported by a supporting pin 212a, and a detecting edge 212b of the data sheet detection actuator 212 is provided so as to project over a position along the transport path where the detecting edge 212b is moved by the data sheet 216 being fed from the document board 214. An end portion 212c of the data sheet detection actuator 212, which is opposite to the detecting edge 212b, projects over the optical path of a light beam emitted from the light emitting elements of the detection group 205b. This data sheet detection actuator 212 is rotated around the supporting pin 212a when the detecting edge 212b is moved by the data sheet 216. And, the sheet edge detection actuator 213 is rotatably supported by a supporting pin 213a, and a detecting edge 213b of the sheet edge detection actuator 213 is provided so as to project over a position along the transport path 215 along which the data sheet 216 is transported. An end portion 213c of the sheet edge detection actuator 213, which is opposite to the detecting edge 213b, projects over the optical path of a light beam emitted from the light emitting elements of the detection group 205b. The sheet edge detection actuator 213 is rotated around the supporting pin 213a when the detecting edge 213b is moved by the data sheet 216 being transported.

As shown in FIG. 26, the end portion 212c of the data sheet detection actuator 212 and the end portion 213c of the sheet edge detection actuator 213 are located in the optical path of a light beam from the detection group 205b of the light source 205 which is reflected from the reflector 211. As described above, a light beam from the reflector 211 is reflected on the mirrors 207, 208, 209 and a light beam from the mirror 209 is directed to the photoconductive element array 210 through the lens 209. When the detecting edge 212b of the actuator 212 and the detecting edge 213b of the actuator 213 are not moved by the data sheet 216, the light beam being directed to the detection group 210b of the photoconductive element array 210 is cut off by the end potions 212c and 213c, and the photoconductive elements of the detection group 210b do not receive such a light beam. When the detecting edge 212b and the detecting edge 213b is moved by the data sheet 216, the end portion 212c and the end portion 213c comes out of the optical path of the light beam from the detection group 205b, and the light beam is not cut off by the end portions 212c and 213c. The optical path of the light beam being directed to the photoconductive element array 210 which light beam is cut off by the data sheet detection actuator 212 and the sheet edge detection actuator 213 is indicated by a shading in FIG. 26.

The supporting pin 212a of the actuator 212 and the supporting pin 213a of the actuator 213 are provided so as to have a longitudinal axis extending in a direction perpendicular to the optical axis of a light beam reflected from the reflector 211 and directed to the photoconductive element array 210. Therefore, the data sheet detection actuator 212 and the sheet edge detection actuator 213 which are rotated around the longitudinal axes of the supporting pins 212a and 213a are moved in a direction parallel to the direction of the optical path of the light beam from the reflector 211, which may be cut off by the end portions 212c and 213c. In addition, the data sheet detection actuator 212 and the sheet edge detection actuator 213 each have a curved portion the end of which is the end portion 212c or the end portion 213c, the curved portion each having a concave part confronting the supporting pin 212a or the supporting pin 213a (which is the rotation axis of the actuator 212 or the rotation axis of the actuator 213). Thus, with the data sheet detection actuator 212 and the sheet edge detection actuator 213 having such a construction as described above, a detection of the data sheet and the data sheet edge can be made accurately.

Next, the construction of the end portion 212c of the data sheet detection actuator 212 and the end portion 213c of the sheet edge detection actuator 213 in this third embodiment will be described in more detail. In FIG. 31, the actuator end portion (the end portion 212c of the actuator 212 or the end portion 213c of the actuator 213) has inside and outside surfaces with relation to an optical axis PL of a light beam directed to the photoconductive element array 210. As shown in FIG. 31, it is assumed that the outside surface of the actuator end portion 212c or 213c is at a angle $\theta a1$ to the direction of the optical axis PL, and the inside surface of the actuator end portion 212c or 213c is at an angle $\theta a2$ to the direction of the optical axis PL. A light beam PS, which is emitted from the detection group 205b of the light source 205 and directed to the photoconductive element array 210, has inside and outside beam surfaces with relation to the optical axis PL. It is assumed that the outside beam surface of the light beam PS is at an angle $\theta b1$ to the optical axis PL, and the inside beam surface of the light beam PS is at an angle $\theta b2$ to the optical axis PL. A relationship between the angles $\theta a1$ and $\theta b1$ and a relationship between the angles $\theta a2$ and $\theta b2$ are represented by the following formulas:

$$\theta a1 \leq \theta b1, \theta a2 \leq \theta b2 \qquad (1)$$

According to the present invention, the end portion 212c of the data sheet detection actuator 212 and the end portion 213c of the sheet edge detection actuator 213 are provided so as to meet the requirement represented by the above formulas. Thus, it is possible to prevent the range in which a light beam directed to the photoconductive element array is screened by the end portion 212c or the end portion 213c from unnecessarily being expanded. And, it is possible to prevent a reduction of the luminous intensity of light irradiated from the detection group 205b of the light source 205 to the detection group 210b of the photoconductive element array 210.

Next, a description will be given of the operation of the third embodiment of the document reading apparatus according to the present invention. When no data sheet 216 is placed on the document board 214, the detecting edge 212b of the data sheet detection actuator 212 and the detecting edge 213b of the sheet edge detection actuator 213 are not moved by the data sheet, and the end portion 212c and the end portion 213c are located in the optical path of the light beam PS supplied from the detection group 205b of the light source 205. The light beam directed to the detection group 205b to the detection group 210b of the array 210 is cut off by the end portion 212c and the end portion 213c. In this case, the end portion 212c of the actuator 212 and the end portion 213c of the actuator 213 are arranged in the document reading apparatus so as to meet the requirement represented by the formula (1) above, and therefore it is possible to prevent the light beam directed to the photoconductive element array 210 from being unnecessarily screened by the end portions 212c and 213c. And, it is possible to prevent a reduction of the luminous intensity of the light beam. As a result, the detection of the actions of the actuators 212 and 213 can be made accurately by receiving a signal outputted from the photoconductive element array 210. Accordingly, with the data sheet detection actuator 212 and the sheet edge detection actuator 213 described above, the presence of the data sheet 216 on the document board 214 and the transporting position of the data sheet 216 in the transport path 215 can accurately be detected.

When the data sheet 216 is placed on the document board 214, the detecting edge 212b of the data sheet detection actuator 212 is moved by the data sheet 216, and the actuator 212 is rotated around the supporting pin 212a. As described above, the supporting pin 212a of the actuator 212 is arranged so as to have a longitudinal axis perpendicular to the direction of the light beam PS directed to the detection group 210b of the photoconductive element array 210, and the end portion 212c of the actuator 212 is formed so as to have a curved portion with its concave part confronting the supporting pin 212a. Therefore, the end portion 212c of the data sheet detection actuator 212 is, as shown in FIG. 32, capable of screening the light beam, invariably at the same position, which is directed to the photoconductive element array 210. Thus, variations in width and in luminous intensity of the light beam PS, directed to the detection group 210b of the photoconductive element array 210, can be reduced stably, and the detection of the data sheet on the document board can be made accurately.

Then, the data sheet 216 is transported one by one along the transport path 215 to the reading position P by means of the roller 202 and the separator 203. The end portion 213b of the sheet edge detection actuator 213 is moved by the data sheet 216 and the sheet edge detection actuator 213 is rotated around the supporting pin 213a. Similar to the above data sheet detection actuator 212, the supporting pin 213b of the actuator 213 is arranged so as to have a longitudinal axis perpendicular to the direction of the light beam PS directed to the detection group 210b of the photoconductive element array 210, and the end portion 213c of the actuator 213 is formed so as to have a curved portion with its concave part confronting the supporting pin 213a. Therefore, the end portion 213c of the sheet edge detection actuator 213 is, as shown in FIG. 32, capable of screening the light beam, invariably at the same position, which is directed to the photoconductive element array 210. Thus, variations in width and in luminous intensity of the light beam PS, directed to the detection group 210b of the photoconductive element array 210, can be reduced stably, and the detection of the front edge and rear edge of the data sheet 216 in the transport path 215 can be made accurately. And, the reflector 211 is provided at a position in the vicinity of the reading position P which is nearer to the light source 205 than the sheet guide plate 201, and therefore, even when a skewed data sheet is transported in the transport path 215, there is no influence on the detection of the data sheet edge due to such a skewed data sheet.

In the case of the third embodiment of the document reading apparatus according to the present invention, the detection of a data sheet on the document board as well as the detection of a data sheet edge in the transport path can be made accurately and stably. The running conditions of the document reading apparatus 200 can be controlled accurately in accordance with the conditions of the data sheet on the document board or in the sheet transport path.

Figure 34:
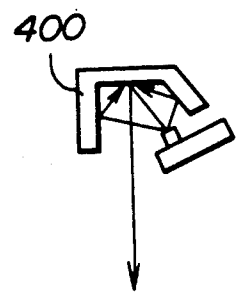
Figure 35:
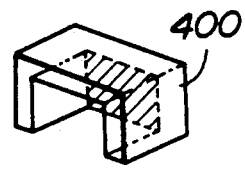
Figure 36:
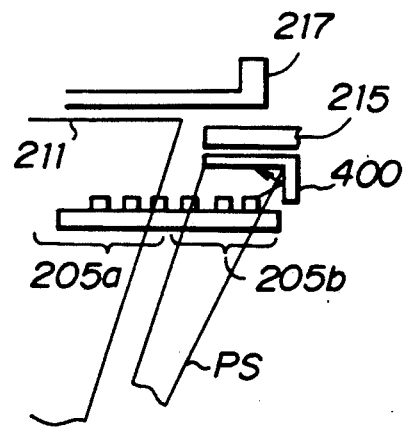

In this third embodiment of the document reading apparatus, a sheet-like part as shown in FIG. 26 is used as the reflector 211, but the reflector 211 is not limited only to the shown example. For example, a reflector 300 having a concave surface confronting the light source 205 which is illustrated in FIG. 33 may be used as a modified example of the reflector 211. When the reflector 300 is provided in the document reading apparatus 200, the irradiation of the light beam from the detection group 205b of the light source 205 to the detection group 210b of the photoconductive element array 210 can be made efficiently. And, a reflector 400 having a polygonal cross-section which is illustrated in FIGS. 34 through 36 may be used as another modified example of the reflector 211. Especially, the reflector 400 shown in FIG. 36 is provided so as to surround the detection group 205b of the light source 205. When the reflector 400 is provided in the document reading apparatus 200, the irradiation of the light beam from the detection group 205b of the light source 205 to the detection group 210b of the photoconductive element array 210 can be made efficiently. The bottom surface of the reflector 400 having a polygonal cross-section may be formed into a flat surface or concave surface. And, a crimp surface shown in FIG. 28 and a recessed surface shown in FIGS. 29 and 30, which are described above with respect to the reflector 211 of the second embodiment, may be applied to the reflector 300 shown in FIG. 33 and to the reflector 400 shown in FIGS. 34 to 36. When the reflector 300 or the reflector 400 which has a crimp surface or recessed surface is provided in the document reading apparatus 200, the detection of a data sheet and a data sheet edge by the photoconductive element array 210 can be made more accurately.

Further, the present invention is not limited only to the above described embodiments, and variations and modifications may be made without departing from the scope of the present invention.

What is claimed is:

1. A document reading apparatus comprising:
   a document board on which a plurality of documents are placed;
   a transport path along which a document among the plurality of documents is transported to a reading position where image information is read from the document;
   light source means for generating a light beam which scans a document at the reading position along a main scan line by a predetermined scan width in parallel to the main scan line, said light source means having a plurality of light emitting elements aligned in a direction parallel to the main scan line, said plurality of light emitting elements being divided into a scanning group;
   photoconductive means for supplying a signal outputted when said photoconductive means is illuminated by a light beam from said light source means, said photoconductive means having a plurality of photoconductive elements aligned within a predetermined width in a direction parallel to the main scan line, said plurality of photoconductive elements of said photoconductive means extending in a direction parallel to the main scan line by a width different by which said predetermined width of said plurality of photoconductive elements is greater than said optical width on said optical means, said plurality of photoconductive elements of said photoconductive means being divided into an image reading group arranged to read said image information from said document and a document detecting group arranged to detect the presence of said document on the document board and/or a front edge or rear edge of said document in said transport path;

optical means for focusing a light beam reflected from said document at the reading position into a reduced light beam and for irradiating said reduced light beam to said photoconductive means by an optical width on said photoconductive means in a direction parallel to the main scan line;

rotatable lever means having a first end placed in said transport path and rotatable about a point outside said path wherein a second end forms a document detection means which is formed on said second end portion wherein said second end projects over an optical path of a light beam from said detection group of light emitting elements in which said light beam is directed by said optical means to said document detecting group of photoconductive elements is partially cut off by said end portion when said document detection means is not rotated by the document placed on the document board or transported along the transport path; and on-time period control means for controlling a turn-on time period of said scanning group of light emitting elements in said light source means for which said light emitting elements of said scanning group are turned ON continuously;

wherein a transport condition of a document being placed or transported within said document reading apparatus is detected on the basis of a signal outputted from said document detecting group in said photoconductive means when a light beam supplied from said detection group in said light source means and directed to said document detecting group in said photoconductive means is partially cut off by said end portion of said document detection means, thereby allowing said on-time period control means to control said turn-on time period of said scanning group of light emitting elements in said light source means.

2. The apparatus as claimed in claim 1, wherein said document detection means comprises first detection means for detecting a document on the document board and second detection means for detecting a front edge or rear edge of the document transported along the transport path to the reading position.

3. The apparatus as claimed in claim 2, wherein said first detection means is provided rotatably around a central axis in a plane perpendicular to the main scan line and has a first detecting end portion and a first shading end portion opposite to said first detecting end portion, said first detection means being actuated so that said first detecting end portion projects over a position where said first detecting end portion is moved by the document placed on the document board, said first shading end portion projecting over an optical path in which a light beam from said detection group of light emitting elements is reflected from said reflection means and directed by said optical means to said document detecting group of photoconductive elements is partially cut off by said first shading end portion, said light beam being cut off by said first shading end portion when said first detection means is rotated by said document.

4. The apparatus as claimed in claim 3, wherein said plane in which said first detection means is rotated by said document is parallel to said optical path of said light beam, said first shading end portion being provided at an end of a curved part with a concave surface confronting said central axis.

5. The apparatus as claimed in claim 2, wherein said second detection means is provided rotatably around a central axis in a plane perpendicular to the main scan line and has a second detecting end portion and a second shading end portion opposite to said second detecting end portion, said second detection means being actuated so that said second detecting end portion projects over a position in the transport path where said second detecting end portion is moved by the document transported along said transport path, said second shading end portion projecting over an optical path in which a light beam from said detection group of light emitting elements is reflected from said reflection means and directed by said optical means to said document detecting group of photoconductive elements is partially cut off by said second shading end portion, said light beam being not cut off by said second shading end portion when said second detection means is rotated by said document.

6. The apparatus as claimed in claim 5, wherein said plane in which said second detection means is rotated by said document is parallel to said optical path of said light beam, said second shading end portion being provided at an end of a curved part with a concave surface confronting said central axis.

7. A document reading apparatus comprising:
a document board on which a plurality of documents are placed;
a transport path along which a document among the plurality of documents is transported to a reading position where image information is read from the document;
a light source means for generating a light beam which scan a document at the reading position along a main scan line by a predetermined scan width in parallel to the main scan line, said light source means having a plurality of light emitting elements aligned in a direction parallel to the main scan line, said plurality of light emitting elements being divided into a scanning group and a detection group said detection group of light emitting elements being turned ON invariably when a power switch of the document reading apparatus is turned ON;
photoconductive means for supplying a signal outputted when said photoconductive means is illuminated by a light beam from said light source means, said photoconductive means having a plurality of photoconductive elements aligned within a predetermined width in a direction parallel to the main scan line, said plurality of photoconductive elements of said photoconductive means extending in a direction parallel to the main scan line by a width difference by which said predetermined width of said plurality of photoconductive element is greater than said optical width of said optical means, said plurality of photoconductive elements of said photoconductive means being divided into an image reading group arranged to read said image information from said document and a document detecting group arranged to detect the presence of said document on said document board and/or a front edge or rear edge of said document in said transport path;
optical means for focusing a light beam reflected from said document at the reading position into a reduced light beam and for irradiating said reduced light beam to said photoconductive means by an optical width on said photoconductive means in a direction parallel to the main scan line;

reflection means for reflecting a light beam supplied from said detection group of light emitting elements and for irradiating said reflected light beam to said document detecting group of photoconductive elements through said optical means; and rotatable lever means having a first end placed in said transport path and rotatable about a point outside said path wherein a second end forms a document detection means which is formed on said second end portion wherein said second end projects over an optical path of a light beam form said detection group of light emitting elements in said light beam is directed by said reflection means and by said optical means to said document detecting group of photoconductive elements is partially cut off by said end portion when said document detection means is not rotated by the document placed on the document board or transported along the transport path, wherein a transport condition of a document being placed or transported within said document reading apparatus is detected on the basis of a signal outputted from said document detecting group in said photoconductive means when a light beam supplied from said detection group in said light source means and directed to said document detecting group in said photoconductive means is partially cut off by said end portion of said document detection means.

8. The apparatus as claimed in claim 7, wherein said end portion of said document detection means is arranged such that said end portion has an inside surface and an outside surface with relation to an optical axis of a luminous flux irradiated from said detection group in said light source means which is directed to said document detecting group in said photoconductive means, said luminous flux having an inside flux surface and an outside flux surface with relation to said optical axis, the inside and outside surfaces of said end portion and the inside and outside flux surfaces of said luminous flux being arranged so as to meet requirements which are represented by formulas: $\theta a1 \leq \theta b1$, $\theta a2 \leq \theta b2$, where $\theta a1$ is an angle between the outside surface of said end portion and the optical axis, $\theta a2$ is an angle between the inside surface of said end portion and the optical axis, $\theta b1$ is an angle between the outside flux surface and the optical axis, and $\theta b2$ is an angle between the inside flux surface and the optical axis.

9. The apparatus as claimed in claim 7, wherein said reflection means is provided at a position out of said transport path in the vicinity of said reading position, said position where said reflection means is provided being located on the same side as said light source means with relation to the transport path and extending from said predetermined scan width of said light source means in a direction parallel to the main scan line in which a light beam from said scanning group of light emitting elements is scanned over the document at the reading position by said predetermined scan width.

10. The apparatus as claimed in claim 7, wherein said document detection means comprises first detection means for detecting a document on the document board and second detection means for detecting a front edge or rear edge of the document transported along the transport path to the reading position.

11. The apparatus as claimed in claim 10, wherein said first detection means is provided rotatably around a central axis in a plane perpendicular to the main scan line and has a first detecting end portion and a first shading end portion opposite to said first detecting end portion, said first detection means being actuated so that said first detecting end portion projects over a position where said first detecting end portion is moved by the document placed on the document board, said first shading end portion projecting over an optical path in which a light beam from said detection group of light emitting elements is reflected from said reflection means and directed by said optical means to said document detecting group of photoconductive elements is partially cut off by said first shading end portion, said light beam being cut off by said first shading end portion when said first detection means is rotated by said document.

12. The apparatus as claimed in claim 11, wherein said plane in which said first detection means is rotated by said document is parallel to said optical path of said light beam, said first shading end portion being provided at an end of a curved part with a concave surface confronting said central axis.

13. The apparatus as claimed in claim 10, wherein said second detection means is provided rotatably around a central axis in a plane perpendicular to the main scan line and has a second detecting end portion and a second shading end portion opposite to said second detecting end portion, said second detection means being actuated so that said second detecting end portion projects over a position in the transport path where said second detecting end portion is moved by the document transported along said transport path, said second shading end portion projecting over an optical path in which a light beam from said detection group of light emitting elements is reflected from said reflection means and directed by said optical means to said document detecting group of photoconductive elements is partially cut off by said second shading end portion, said light beam being not cut off by said second shading end portion when said second detection means is rotated by said document.

14. The apparatus as claimed in claim 13, wherein said plane in which said second detection means is rotated by said document is parallel to said optical path of said light beam, said second shading end portion being provided at an end of a curved port with a concave surface confronting said central axis.

* * * * *